(12) United States Patent
Sakikawa et al.

(10) Patent No.: US 7,658,257 B2
(45) Date of Patent: Feb. 9, 2010

(54) PUMP SYSTEM AND AXLE-DRIVING SYSTEM

(75) Inventors: Shigenori Sakikawa, Hyogo (JP); Hiroshi Kitagawara, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 0 days.

(21) Appl. No.: 12/163,077

(22) Filed: Jun. 27, 2008

(65) Prior Publication Data

US 2008/0271939 A1 Nov. 6, 2008

Related U.S. Application Data

(62) Division of application No. 11/190,880, filed on Jul. 28, 2005, now Pat. No. 7,407,030.

(30) Foreign Application Priority Data

Aug. 24, 2004 (JP) ............... 2004-244390
Sep. 29, 2004 (JP) ............... 2004-282933

(51) Int. Cl.
*B60K 17/356* (2006.01)
(52) U.S. Cl. .................... 180/308; 180/6.3
(58) Field of Classification Search ............... 180/305, 180/307, 308, 6.3, 6.48
See application file for complete search history.

(56) References Cited

U.S. PATENT DOCUMENTS

| | | | |
|---|---|---|---|
| 4,213,514 A | * | 7/1980 | Ehrlinger et al. ............ 180/308 |
| 4,315,441 A | * | 2/1982 | Fukuda ................... 74/665 M |
| 4,920,733 A | | 5/1990 | Berrios |
| 4,977,970 A | | 12/1990 | Steiger |
| 5,388,450 A | | 2/1995 | Hurth |
| 5,431,245 A | * | 7/1995 | Beck et al. ................. 180/308 |

(Continued)

FOREIGN PATENT DOCUMENTS

DE 34 06 783 8/1984

(Continued)

OTHER PUBLICATIONS

Office Action for priority Japanese Patent Application No. 2004-282933, Japanese Patent Office, mailed on May 1, 2009.

(Continued)

*Primary Examiner*—Frank B Vanaman
(74) *Attorney, Agent, or Firm*—Sterne, Kessler, Goldstein & Fox P.L.L.C.

(57) ABSTRACT

A pump system includes a housing, an input shaft, a pump shaft; a hydraulic pump body, a PTO shaft, a power transmission gear train, and a PTO clutch mechanism. The housing has a narrow gear accommodating space surrounding a region including a mesh point between the first and second transmission gears of the power transmission gear train, a PTO clutch accommodating space which surrounds the PTO clutch mechanism and which is fluidly communicated with the gear accommodating space, and a pair of first and second suction/discharge ports which communicate the internal space of the housing with an outside of the housing. The first suction/discharge port is arranged within the gear accommodating space so as to be positioned in an opposite side to the PTO clutch accommodating space with the mesh point between the first and second transmission gears interposed therebetween.

5 Claims, 20 Drawing Sheets

U.S. PATENT DOCUMENTS

| | | | |
|---|---|---|---|
| 5,472,062 A * | 12/1995 | Nagai et al. | 180/252 |
| 5,560,447 A | 10/1996 | Ishii et al. | |
| 5,823,285 A | 10/1998 | Tsuchihashi et al. | |
| 6,135,259 A * | 10/2000 | Forster | 192/221.1 |
| 6,186,262 B1 | 2/2001 | Mann et al. | |
| 6,443,290 B1 | 9/2002 | Forster | |
| 6,601,474 B2 | 8/2003 | Ishimaru et al. | |
| 6,772,591 B2 | 8/2004 | Ohashi et al. | |
| 2004/0099464 A1 | 5/2004 | Bednar | |
| 2005/0121249 A1 * | 6/2005 | Iwaki et al. | 180/252 |

FOREIGN PATENT DOCUMENTS

| | | |
|---|---|---|
| DE | 100 34 598 | 1/2002 |
| GB | 2 005 612 | 4/1979 |
| GB | 2 261 488 | 5/1993 |
| JP | 56-77437 | 6/1981 |
| JP | S60-244626 | 12/1985 |
| JP | S64-017829 | 1/1989 |
| JP | 08-113053 | 5/1996 |
| JP | 2000-71790 | 3/2000 |
| JP | 2003-291674 | 10/2003 |
| JP | 2004-210215 | 7/2004 |

OTHER PUBLICATIONS

European Search Report for European Application No. EP 1 630 030 A3, mailed on Feb. 19, 2008.

* cited by examiner

PUMP SYSTEM AND AXLE-DRIVING SYSTEM

CROSS-REFERENCE TO RELATED APPLICATION

This application is a divisional of U.S. application Ser. No. 11/190,880, filed Jul. 28, 2005, the entire disclosure of which is hereby incorporated herein by reference thereto.

BACKGROUND OF THE INVENTION

1. Field of the Invention

The present invention relates to a pump system provided with a hydraulic pump body and a PTO unit, and an axle-driving system which is provided for each drive axle and independently drives the corresponding drive axle in cooperation with an actuator.

2. Background Art

There has been conventionally used in various fields a pump system which includes a hydraulic pump body and a PTO unit and has a structure that an input from a driving source is input to both of the hydraulic pump body and the PTO unit (see, for example, JP-A 2003-291674).

Such a pump system is particularly useful in a working vehicle or the like, for example, because the hydraulic pump body can form a travel transmission path in cooperation with an actuator such as a hydraulic motor body or the like arranged apart from the pump system, and the PTO unit can form a PTO transmission path for transmitting a power to an external working machine.

However, the conventional pump system does not sufficiently take cooling efficiency for a PTO clutch mechanism in the PTO unit into consideration.

In other words, the PTO unit has a PTO shaft, and a PTO clutch mechanism which selectively engages/disengages a power transmission from the driving source to the PTO shaft.

Specifically, the PTO clutch mechanism is accommodated in a housing of the pump system which can reserve oil. The reserved oil within the housing can somewhat cool the PTO clutch mechanism. However, in the case that the reserved oil is retained, it is impossible to expect a sufficient cooling effect.

An aspect of the present invention has been made in view of the conventional art, and a main object of the present invention is to provide a pump system in which a hydraulic pump body and a PTO clutch mechanism are accommodated in a housing which can reserve oil, and which can improve a cooling efficiency for the PTO clutch mechanism.

In addition, there is a known axle-driving system which includes a motor unit forming a non-stepwise speed change device in cooperation with the actuator. The axle-driving system is provided for each drive axle.

The known axle-driving system will be described by taking a case in which a hydraulic pump unit is used as the actuator and a hydraulic motor unit in fluid communication with the hydraulic pump unit is used as the motor unit (e.g., U. S. Pat. No. 4,920,733 or Japanese Utility Model Publication No. S 56-77437).

In the axle-driving systems described in these prior art documents, a turning ability of the vehicles, especially an ability to make a small turn of a vehicle can be advantageously improved since each of the drive axles can be independently driven with changing its rotational speed. The miniaturization of the entire apparatus, however, has been left to be improved.

Particularly, to make a smaller turn of a vehicle, it is preferred to provide with a brake unit for each drive axle. Neither of the prior art documents, however, mentions such a brake unit, and, of course, there is no description as to how the brake unit could be reduced in its capacity and size.

BRIEF SUMMARY OF THE INVENTION

According to one aspect of the present invention, there is provided a pump system including a housing capable of reserving oil in an internal space; an input shaft supported by the housing so as to be operatively connected to a driving source; a pump shaft supported by the housing; a hydraulic pump body which is accommodated in the housing and is driven by the pump shaft; a PTO shaft supported by the housing; a power transmission gear train which transmits a power from the input shaft to the pump shaft and the PTO shaft, and is accommodated in the housing; and a PTO clutch mechanism accommodated in the housing so as to be positioned in a power transmission path from the input shaft to the PTO shaft.

The power transmission gear train has at least two first and second transmission gears meshed with each other.

The housing has a narrow gear accommodating space surrounding a region including a mesh point between the first and second transmission gears, a PTO clutch accommodating space which surrounds the PTO clutch mechanism and which is fluidly communicated with the gear accommodating space, and a pair of first and second suction/discharge ports which communicate the internal space of the housing with an outside of the housing.

The first suction/discharge port is arranged within the gear accommodating space so as to be positioned in an opposite side to the PTO clutch accommodating space with the mesh point between the first and second transmission gears interposed therebetween.

With the pump system according to the present invention, it is possible to effectively prevent the oil from being retained within the PTO clutch accommodating space by means of a pump action accompanied with rotating motions of the first and second transmission gears, so that it is possible to improve a cooling efficiency for the PTO clutch mechanism.

Preferably, a first fluid groove extending from the first suction/discharge port to the PTO clutch accommodating space via the mesh point is formed in at least one of a pair of inner surfaces of the housing, the inner surfaces defining the gear accommodating space and facing to each other with the first and second transmission gears interposed therebetween.

With this configuration, it is possible to further elicit the pump action by means of the first and second transmission gears.

More preferably, the first fluid groove extending from the first suction/discharge port to the PTO clutch accommodating space via the mesh point is formed also in the other of the pair of inner surfaces of the housing.

In the above various configurations, preferably, the first suction/discharge port is positioned in an upstream side in a rotational direction of the first and second transmission gears on the basis of the mesh point.

In the above various configurations, the second suction/discharge port may be arranged within the gear accommodating space.

Preferably, the first and second suction/discharge ports are provided in the vicinity of an outer peripheral edge of the first or second transmission gear, and the housing has a partition portion for preventing a direct oil flow between the first and second suction/discharge ports.

Preferably, a second fluid groove extending from the PTO clutch accommodating space to the second suction/discharge port is formed in at least one of a pair of inner surfaces of the housing. The inner surfaces defining the gear accommodating space and facing to each other with the first and the second transmission gears interposed therebetween.

More preferably, the second fluid groove extending from the PTO clutch accommodating space to the second suction/discharge port is formed also in the other of the pair of inner surfaces of the housing.

Preferably, the second fluid groove is formed so as to face an outer peripheral edge of any transmission gear forming the power transmission gear train. In such a case, the second suction/discharge port is positioned in a downstream side in a rotational direction of the transmission gear.

In the above various configurations, the housing may include a base housing for accommodating the power transmission gear train and the PTO clutch mechanism, and a pump case which is detachably coupled to the base housing and accommodates the hydraulic pump body.

Preferably, an opening fluidly communicating the internal space of the pump case with the gear accommodating space is provided in the pump case and the base housing.

In the above various configurations, the pump shaft may include first and second pump shafts, and the hydraulic pump body may include first and second hydraulic pump bodies respectively driven by the first and second pump shafts.

In one embodiment, the first and second hydraulic pump bodies are arranged in parallel.

In the other embodiment, the first and second hydraulic pump bodies are arranged in series.

According to one aspect of the present invention, there is also provided a pump system including a base housing which has an input portion operatively connected to a driving source and which is capable of being directly or indirectly attached to a support member; a pump unit which has first and second pump shafts, first and second hydraulic pump bodies respectively driven by the first and second pump shafts, and a pump case surrounding the first and second hydraulic pump bodies, the pump case being detachably coupled to the base housing; a PTO unit having a PTO shaft and a PTO clutch mechanism accommodated in the base housing in a state of being supported by the PTO shaft; and a power transmission gear train which transmits a power from the input portion to the first pump shaft, the second pump shaft and the PTO shaft, and which is accommodated in the base housing.

The power transmission gear train has first and second transmission gears meshed with each other.

The base housing has a narrow gear accommodating space surrounding a region including a mesh point between the first and second transmission gears, a PTO clutch accommodating space which surrounds the PTO clutch mechanism and which is fluidly communicated with the gear accommodating space, and a pair of first and second suction/discharge ports which fluidly communicates the gear accommodating with an outside of the housing.

The first suction/discharge port is positioned in an opposite side to the PTO clutch accommodating space with the mesh point between the first and second transmission gears interposed therebetween.

A first fluid groove extending from the first suction/discharge port to the PTO clutch accommodating space via the mesh point is formed in at least one of a pair of inner surfaces of the base housing, the inner surfaces defining the gear accommodating space and facing to each other with the first and second transmission gears interposed therebetween.

In one embodiment, the first and second hydraulic pump bodies are arranged in series with the base housing interposed therebetween.

In such a embodiment, the pump case includes first and second pump cases respectively surrounding the first and second hydraulic pump bodies.

In the other embodiment, the first and second hydraulic pump bodies are arranged in parallel on the same side of the base housing.

In such an embodiment, the pump case may be configured so as to surround both of the first and second hydraulic pump bodies.

Alternatively, the pump case may include first and second pump cases respectively surrounding the first and second hydraulic pump bodies.

According to another aspect of the present invention, there is provided an axle-driving system including an axle case, a motor unit and a reduction transmission unit.

The axle case has an outer wall which supports a drive axle in a rotatable manner around its axis and an inner wall which is disposed apart from the outer wall inwardly in the widthwise direction of the vehicle so that the inner end portion of the drive axle in the widthwise direction of the vehicle is positioned between the inner wall and the outer wall.

The motor unit forms a non-stepwise speed change device in cooperation with an actuator disposed apart therefrom. The motor unit includes a motor case which is connected to the inner wall of the axle case, a motor shaft which is supported by the motor case in a rotatable manner around its axis, and a motor body which is accommodated in the motor case while being supported on the motor shaft.

The reduction transmission unit is accommodated in the axle case.

The motor shaft has an outer end portion and an inner end portion in the widthwise direction of the vehicle. The outer end portion protrudes outwardly from the motor case so as to be positioned inside an accommodating space of the axle case, and the inner end portion protrudes outwardly from the motor case.

The inner end portion of the motor shaft is provided with a brake unit.

An axle-driving system according to the present invention is so constructed that the output of the motor unit is transmitted to the drive axle via the reduction transmission unit. Therefore, a motor unit of low-torque and high-speed type, which is highly reliable and compact, can be used as the motor unit.

In addition, the system is so constructed that a brake force is applied to the motor shaft prior to deceleration by the reduction transmission unit, and thus the capacity reduction and miniaturization of the brake unit can be achieved.

Furthermore, since the brake unit is not inserted into the reduction transmission unit, distances between the motor shaft, the intermediate shaft in the reduction transmission unit and the drive axle can be shortened. This effectively enables the miniaturization of the entire apparatus in the radial direction with respect to the drive axle.

In one embodiment, the motor case includes a motor case body and a port block. The motor case body has an outer end portion in the widthwise direction of the vehicle detachably coupled to the inner wall of the axle case, and an inner end portion in the widthwise direction of the vehicle forming an opening into which the motor body can be inserted. The port block is detachably coupled to the motor case body to close the opening in a liquid tight manner and is provided with a pair of hydraulic fluid ports serving as fluid connection ports for the actuator.

In the one embodiment, preferably, a bearing member which supports the motor shaft in a rotatable manner around its axis is provided with the outer end portion of the motor case body. At least a part of the bearing member protrudes outwardly of the motor case body. A recess, which engages the bearing member, is provided on the outer surface of the inner wall of the axle case.

In the one embodiment, preferably, the motor case body is configured to be connectable to the inner wall of the axle case in a first connecting position and in a second connecting position, which is circumferentially displaced by 180° from the first connecting position with respect to the motor shaft.

With such a construction, a pair of right and left axle-driving systems can be constructed with identical parts, while the direction of the output adjustment member in the motor unit of the right axle-driving system and the direction of the output adjusting member in the motor unit of the left axle-driving system can be conformed to each other with respect to a traveling direction of the vehicle.

In another embodiment, the motor case includes a motor case body which is integrally formed with the inner wall of the axle case and is provided with an opening into which the motor body can be inserted at an inner end portion in the widthwise direction of the vehicle; and a port block which is detachably coupled to the motor case body to close the opening in a liquid tight manner and is provided with a pair of hydraulic fluid ports serving as fluid connection ports for the actuator.

In the above various configurations, preferably, the motor case body is configured to be connectable to the port block in a first connecting position and in a second connecting position which is circumferentially displaced by 180° opposite from the first connecting position with respect to the motor shaft.

Such a construction allows the conduit arrangements of the pair of right and left axle-driving systems to be the same, thereby piping workability could be enhanced.

BRIEF DESCRIPTION OF THE DRAWINGS/FIGURES

The above, and other objects, features and advantages of the present invention will become apparent from the detailed description thereof in conjunction with the accompanying drawings wherein.

DETAILED DESCRIPTION OF THE INVENTION

Embodiment 1

Hereinafter, a preferable embodiment of a pump system according to the present invention will be described with reference to the accompanying drawings.

Figure 1:
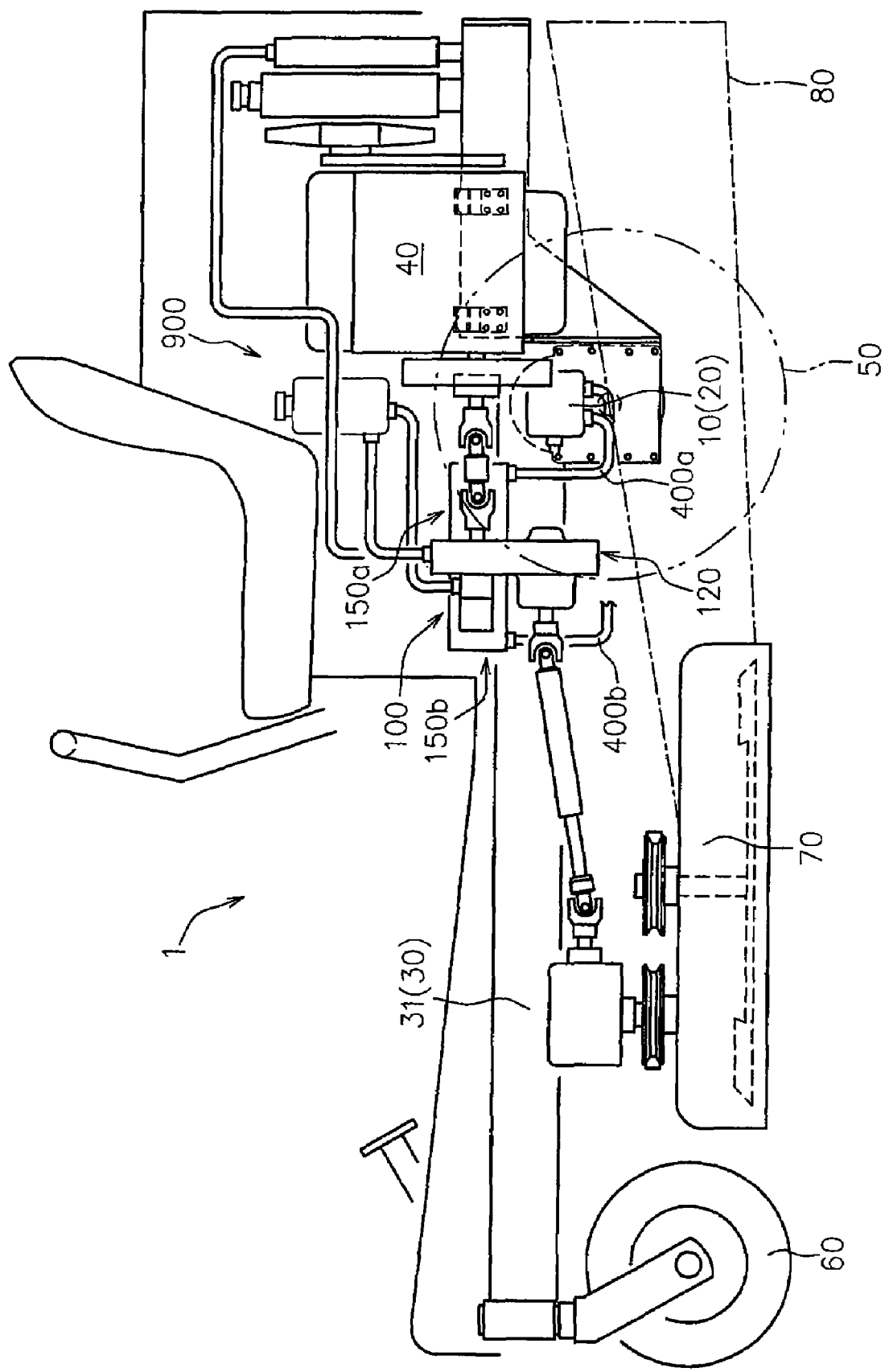
FIG. 1 is a side view of a working vehicle to which a pump system in accordance with a first embodiment of the present invention is applied.
Figure 2:
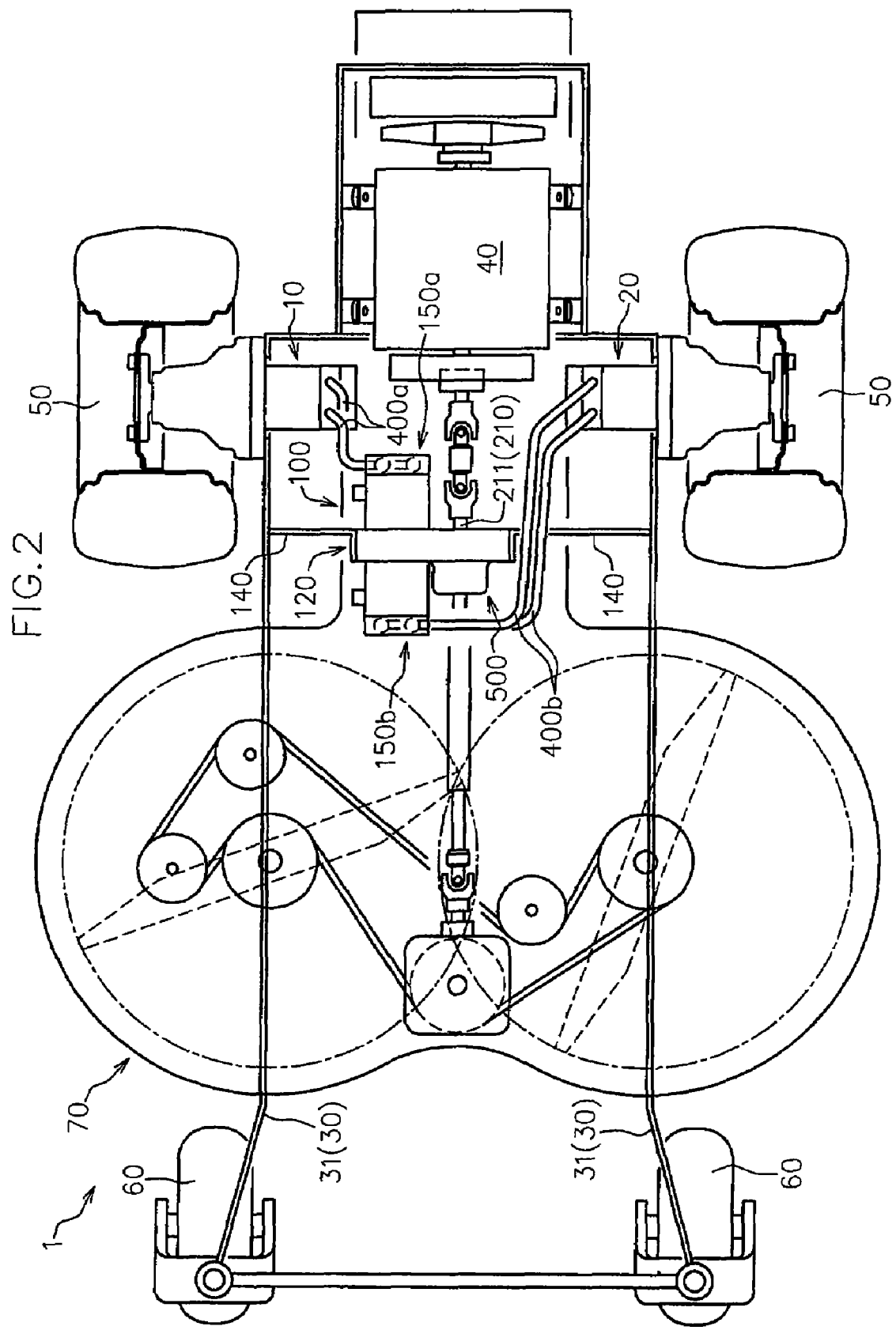
FIG. 2 is a plan view of a working vehicle shown in FIG. 1.
Figure 3:
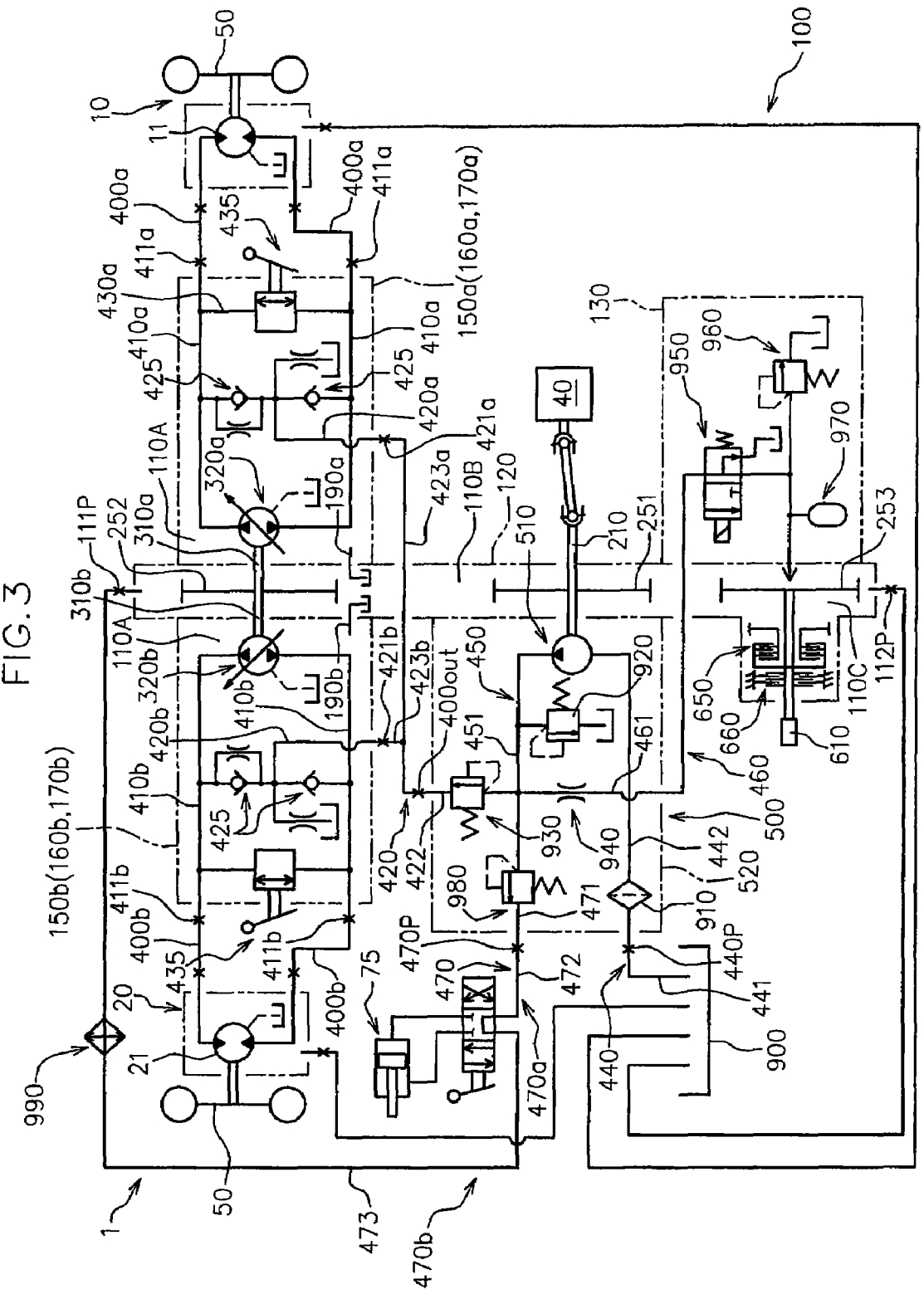
FIG. 3 is a hydraulic circuit diagram of the working vehicle shown in FIGS. 1 and 2.

FIGS. 1 and 2 are respectively a side view and a plan view of a working vehicle 1 to which a pump system 100 in accordance with this embodiment is applied. FIG. 3 is a hydraulic circuit diagram of the working vehicle 1.

As shown in FIGS. 1 and 2, the working vehicle 1 includes a vehicle frame 30, a driving source 40 mounted to the vehicle frame 30, the pump system 100 operatively connected to the driving source 40, a pair of first and second hydraulic motor units 10 and 20 hydraulically connected to the pump system 100, and a pair of right and left driving wheels 50 respectively driven by the pair of first and second hydraulic motor units 10 and 20.

The pump system 100 forms a non-stepwise speed change device for traveling in cooperation with the pair of first and second hydraulic motor units 10 and 20 of the working vehicle 1 and, also, forms a part of a PTO transmission mechanism for transmitting a driving power to a working machine (a mower in an illustrated embodiment) of the working vehicle 1.

In this embodiment, the driving source 40 is supported in a vibration-absorbing manner in a rear region of the vehicle frame 30. Further, the pump system 100 is supported to the vehicle frame 30 so as to be positioned in a front side of the driving source 40.

Herein, reference numerals 60, 70 and 80 in FIGS. 1 and 2 respectively denote a caster wheel, a mower operatively driven by the driving source 40, and a discharge duct forming a conveyance path for conveying the grass reaped by the mower 70 to a rear side of the vehicle.

Figure 4:
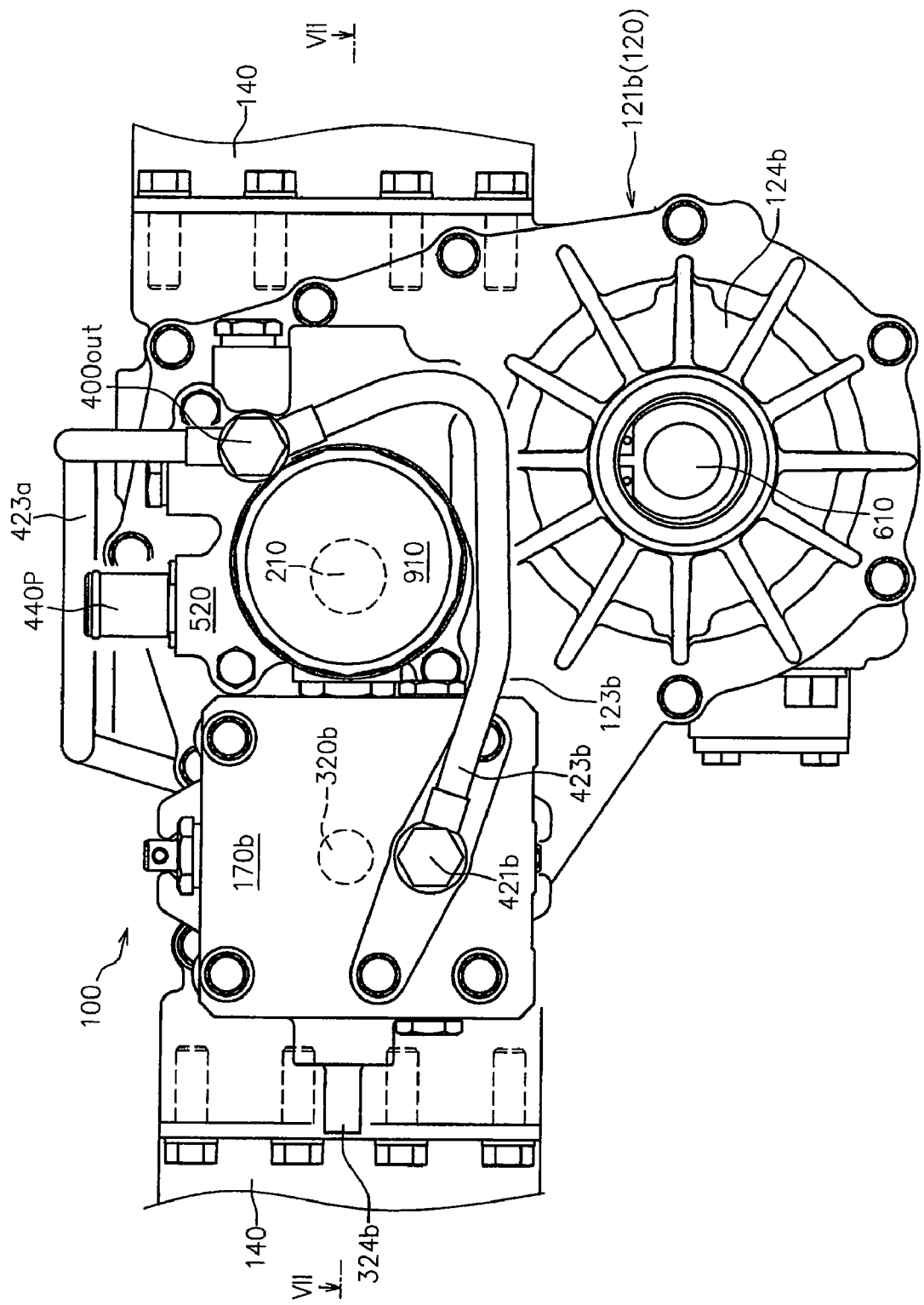
FIG. 4 is a front view of the pump system of the first embodiment.
Figure 5:
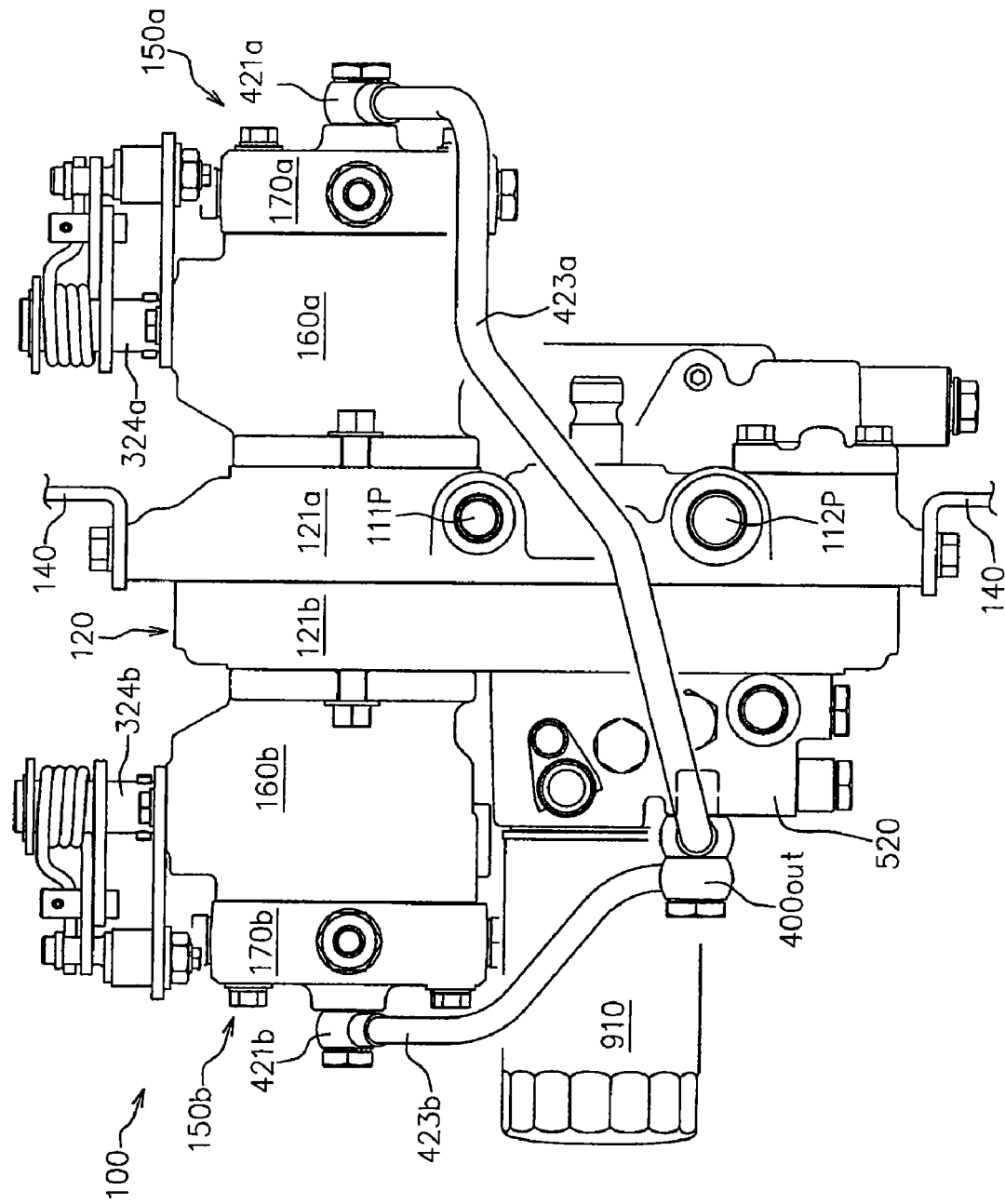
FIG. 5 is a plan view of the pump system shown in FIG. 4.
Figure 6:
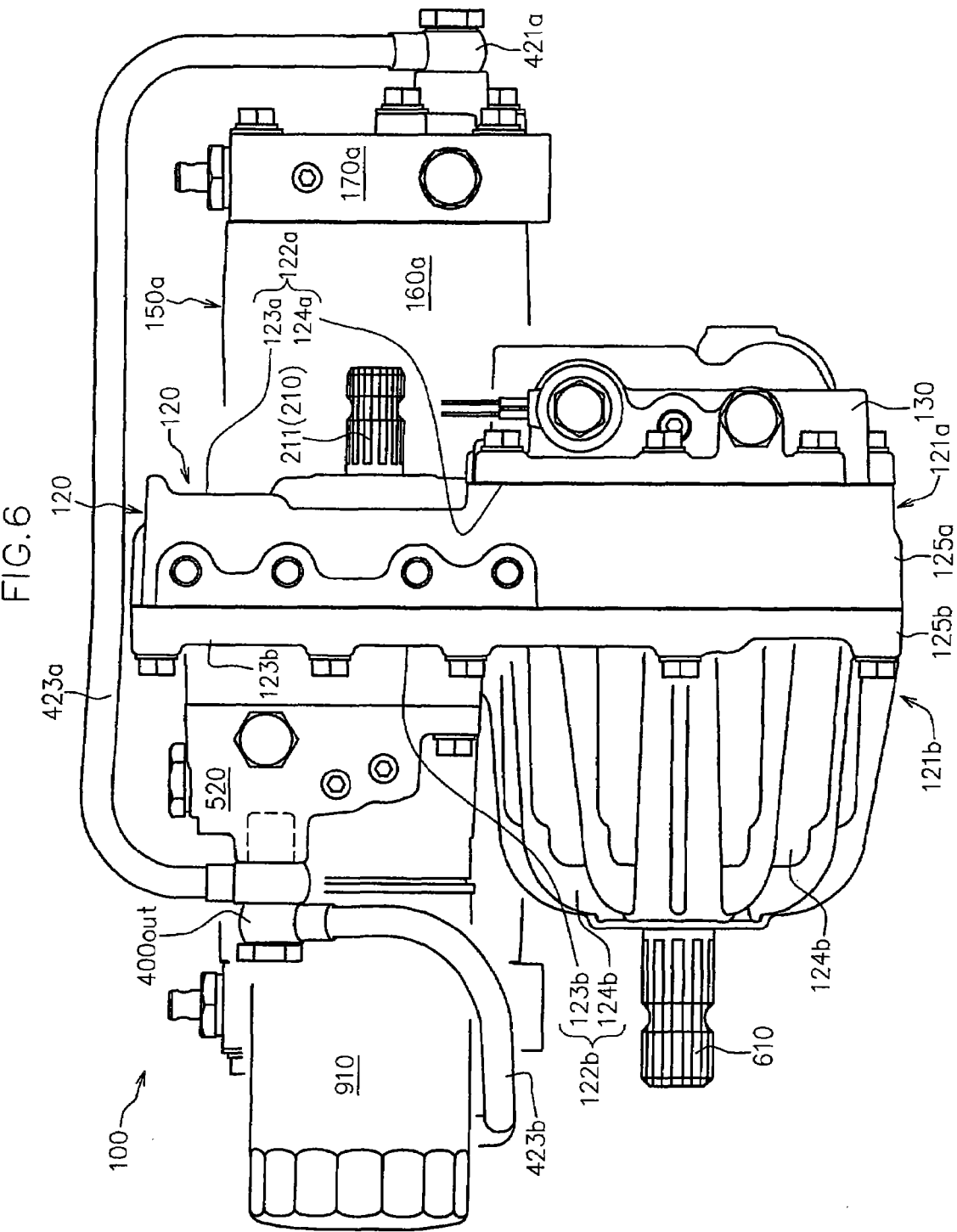
FIG. 6 is a side view of the pump system shown in FIGS. 4 and 5.

FIGS. 4 to 6 are respectively a front view, a plan view and a side view of the pump system 100.

Figure 7:
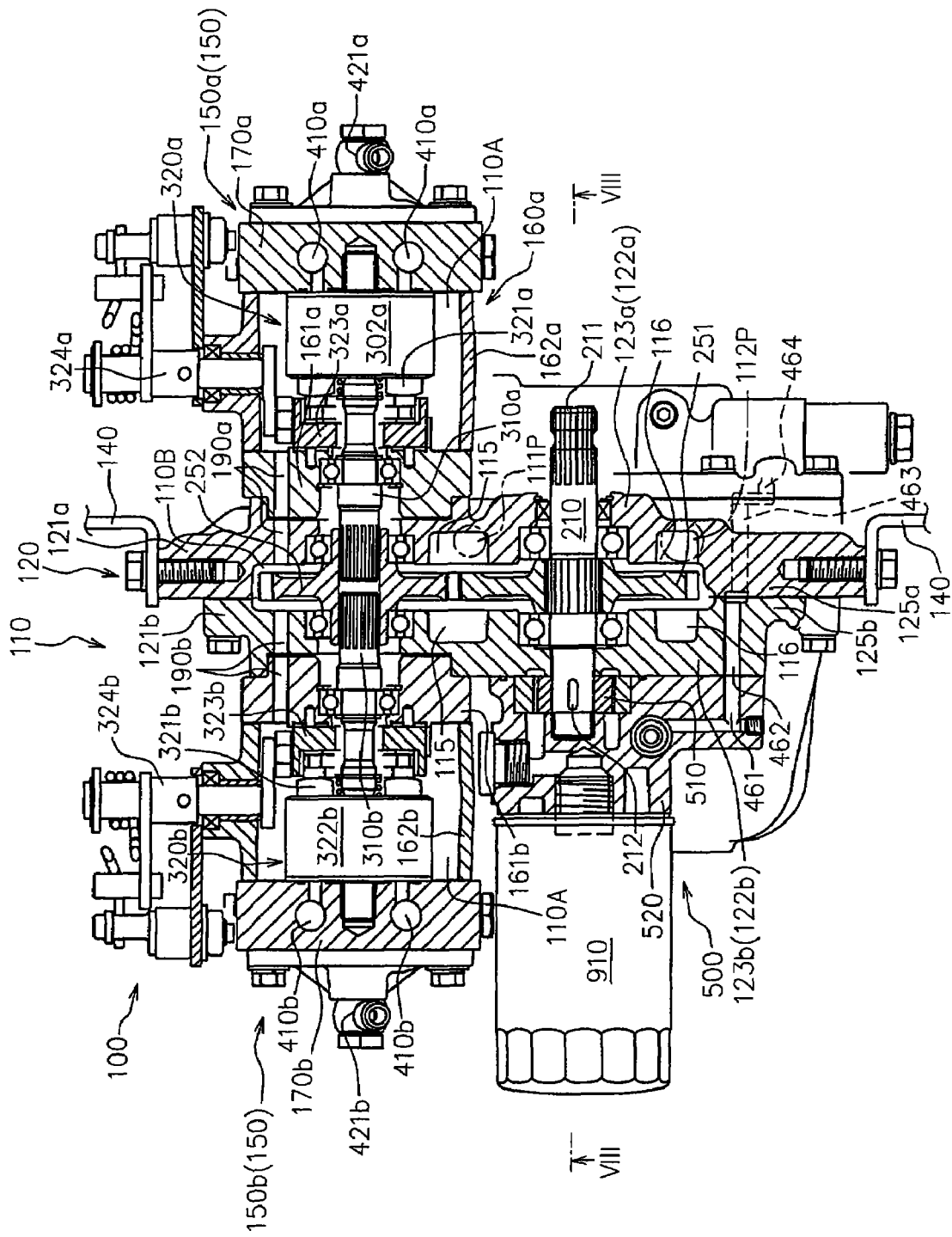
FIG. 7 is a horizontal plan view of the pump system taken along line VII-VII in FIG. 4.

FIG. 7 is a horizontal plan view of the pump system 100 taken along line VII-VII in FIG. 4.

Figure 8:
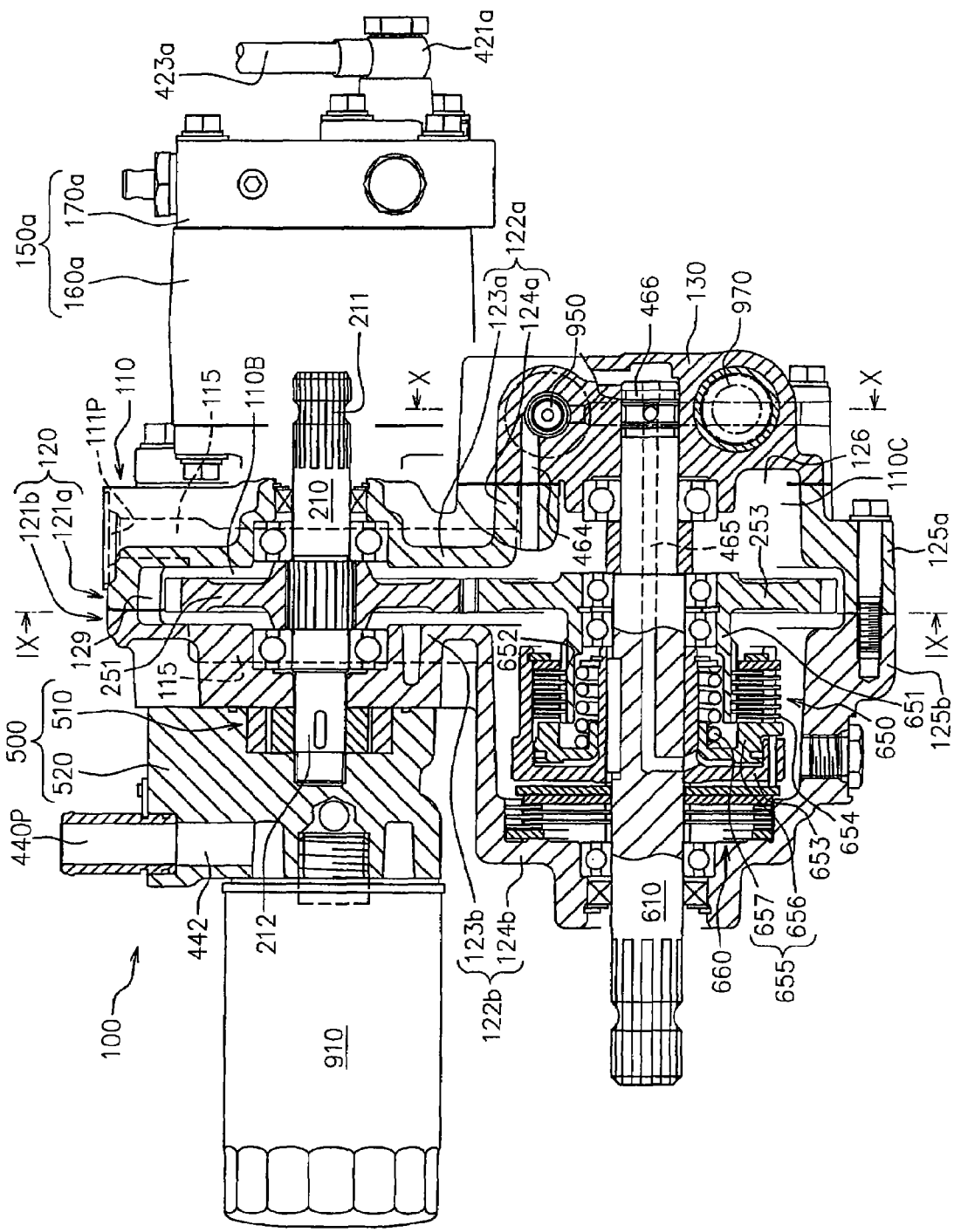
FIG. 8 is a vertical side view of the pump system taken along line VIII-VIII in FIG. 7.

FIG. 8 is a vertical side view of the pump system 100 taken along line VIII-VIII in FIG. 7.

As shown in FIGS. 4 to 8, the pump system 100 includes a housing 110 supported to a support member such as the vehicle frame 30, an input shaft 210 supported to the housing 110 so as to form an input end where one end is operatively connected to the driving source 40, first and second pump shafts 310a and 310b supported to the housing 110, first and second hydraulic pump bodies 320a and 320b which are accommodated in the housing 110 and are respectively driven by the first and second pump shafts 310b, and 310a, a PTO shaft 610 supported to the housing 110, a power transmission gear train 250 which transmits a power from the input shaft 210 to the first pump shaft 310a, the second pump shaft 310b and the PTO shaft 610 and is accommodated in the housing 110, and a PTO clutch mechanism 650 accommodated in the housing 110 so as to be positioned in a power transmission path from the input shaft 210 to the PTO shaft 610.

The housing 110 accommodates the hydraulic pump bodies 320a and 320b, the power transmission gear train 250 and the PTO clutch mechanism 650, and has a structure that an interior space thereof can be utilized as an oil reservoir.

Specifically, as shown in FIGS. 7 and 8, the housing 110 has a pump accommodating space 110A for accommodating the first and second hydraulic pump bodies 320a and 320b, a gear accommodating space 110B surrounding a region including a mesh point T between below mentioned first and second transmission gears 251 and 252 forming the power transmission gear train 250, a PTO clutch accommodating space 110C which accommodates the PTO clutch mechanism 650 and which is fluidly communicated with the gear accommodating space 110B, and a pair of first and second suction/discharge ports 111P and 112P for opening the interior space to an outside of the housing 110.

As shown in FIGS. 7 and 8, in this embodiment, the housing 110 has a base housing 120 and a pump case 150. The base housing 120 defines the gear accommodating space 110B and the PTO clutch accommodating space 110C, and is provided with the first and second suction/discharge ports 111P and 112P. The pump case 150 is detachably coupled to the base housing 120 and defines the pump accommodating space 110A.

The base housing 120 has first and second housing portions 121a and 121b which are detachably coupled to each other so as to form the gear accommodating space 110B and the PTO clutch accommodating space 110C.

Specifically, the first housing portion 121a has a first end wall 122a formed so as to support the input shaft 210, and a first peripheral wall 125a extending to a downstream side (a front side in the vehicle in this embodiment) in a transmitting direction of the input shaft 210 from a peripheral edge portion of the first end wall 122a.

The second housing portion 121b has a second end wall 122b formed so as to support the input shaft 210, and a second peripheral wall 125b extending to an upstream side (a rear side in the vehicle in this embodiment) in the transmitting direction of the input shaft 210 from a peripheral edge portion of the second end wall 122b.

The base housing 120 has a structure that the gear accommodating space 110B and the PTO clutch accommodating space 110C are formed by coupling the first and second housing portions 121a and 121b to each other in a state of contacting an end face of the first peripheral wall 125a and an end face of the second peripheral wall 125b.

Specifically, as shown in FIGS. 6 and 8, the first end wall 122a has a first gear region 123a corresponding to the gear accommodating space 110B, and a first PTO clutch region 124a corresponding to the PTO clutch accommodating space 110C.

The first PTO clutch region 124a is expanded to the upstream side in the transmitting direction of the input shaft 210 from the first gear region 123a.

In the same manner, the second end wall 122b has a second gear region 123b corresponding to the gear accommodating space 110B, and a second PTO clutch region 124b corresponding to the PTO clutch accommodating space 110C (see FIGS. 6 and 8).

The second PTO clutch region 124b is expanded to the downstream side in the transmitting direction of the input shaft 210 from the second gear region 123b.

The first and second gear regions 123a and 123b are formed so as to extend closely and approximately in parallel to each other in a state of coupling the first and second housing portions 121a and 121b, so that the narrow gear accommodating space 110B is defined.

On the other hand, the first and second PTO clutch regions 124a and 124b are apart from each other in such a manner that the PTO clutch accommodating space 110C which can accommodate the PTO clutch mechanism 650 is defined between the first and second PTO clutch regions 124a and 124b.

As shown in FIG. 8, the first PTO clutch region 124a is provided with an opening 126, and the opening 126 is formed so as to be sealed in a liquid tight manner by a lid member 130 detachably coupled to the first end wall 122a.

In this embodiment, the base housing 120 is formed so as to be supported to the vehicle frame 30 via an attachment stay 140.

Specifically, as shown in FIGS. 4, 5 and 7, a pair of right and left attachment stays 140 are coupled to the peripheral wall (the first peripheral wall 125a in the illustrated embodiment) of the base housing 120.

Then, the pair of attachment stays 140 are respectively coupled to a pair of right and left main frames 31 in the vehicle frame 30, so that the base housing 120 is supported to the vehicle frame 30 (see FIG. 2).

A configuration of the pump case 150 will be described later.

The pump system 100 according to this embodiment has an auxiliary pump unit 500 operatively driven by the input shaft 210, in addition to the aforementioned configuration.

Specifically, in this embodiment, as shown in FIGS. 7 and 8, the input shaft 210 is supported by the first end wall 122a in a state that a first end 211 forming the input end protrudes outward, and is supported by the second end wall 122b in a state that a second end 212 extends outward.

Further, the auxiliary pump unit 500 includes an auxiliary pump body 510 driven by the second end 212 of the input shaft 210, and an auxiliary pump case 520 coupled to the second end wall 122b so as to surround the auxiliary pump body 510.

The first and second pump shafts 310a and 310b are supported to the housing 110 in a state of being operatively connected to the input shaft 210 via the power transmission gear train 250.

In this embodiment, as shown in FIGS. 7 and 8, the power transmission gear train 250 includes the first transmission gear 251 supported by the input shaft 210 in a relatively non-rotatable manner, and the second transmission gear 252 which is meshed with the first transmission gear 251 and is supported by both the first and second pump shafts 310a and 310b in a relatively non-rotatable manner.

In other words, in this embodiment, as shown in FIG. 7, the first and second pump shafts 310a and 310b are supported by the base housing 120 so as to be positioned coaxially.

Specifically, the first pump shaft 310a is supported by the first housing portion 121a in such a manner that a base end is positioned within the gear accommodating space 110B and a tip end protrudes outward so as to be extended to an opposite side to the second pump shaft 310b.

On the other hand, the second pump shaft 310b is supported by the second housing portion 121b in such a manner that a base end is positioned within the gear accommodating space 110B and a tip end protrudes outward so as to be extended to an opposite side to the first pump shaft 310a.

Further, the second transmission gear 252 is supported on each of the base ends of the first and second pump shafts 310a and 310b in a relatively non-rotatable manner.

The first and second hydraulic pump bodies 320a and 320b are respectively driven by outer extending portions of the first and second pump shafts 310a and 310b.

In other words, in this embodiment, the first and second hydraulic pump bodies 320a and 320b are respectively arranged so as to be positioned at a first side (a rear side of the vehicle in the illustrated embodiment) and a second side (a front side of the vehicle in the illustrated embodiment) with the base housing 120 interposed therebetween.

As shown in FIG. 3, the first hydraulic pump body 320a is fluidly connected to a first hydraulic motor body 11 in the first motor unit 10 via a pair of first hydraulic fluid lines 400a.

The first hydraulic pump body 320a and the first hydraulic motor body 11 are configured such that at least one of them is of a variable displacement type, thereby forming a first HST variably driving one of the drive wheels 50.

In the same manner, the second hydraulic pump body 320b is fluidly connected to a second hydraulic motor body 21 in the second motor unit 20 via a pair of second hydraulic fluid lines 400b.

The second hydraulic pump body 320b and the second hydraulic motor body 21 are configured such that at least one of them is of a variable displacement type, thereby forming a second HST variably driving the other of the drive wheels 50.

In this embodiment, the first and second hydraulic pump bodies 320a and 320b are of the variable displacement type, and the first and second hydraulic motor bodies 11 and 12 are of a fixed displacement type.

The first hydraulic pump body 320a has a piston unit 321a performing a reciprocating motion in accordance with a rotation of the first pump shaft 310a, and a cylinder block 322a supporting the piston unit 321a in a reciprocatable manner.

As described above, in this embodiment, the first hydraulic pump body 320a is of the variable displacement type.

Accordingly, the first pump body 320a includes an output adjusting member 323a for adjusting suction/discharge rates by changing a slidable range of the piston unit 321a, in addition to the aforementioned configuration.

In this embodiment, a movable swash plate is employed as the output adjusting member 323a, and a shoe provided at a tip end of the piston unit 321a is brought into contact therewith.

The output adjusting member 323a can be externally operated by a control shaft 324a. In this embodiment, a trunnion shaft linked with the output adjusting member 323a via an arm is employed as the control shaft 324a.

Herein, the second hydraulic pump body 320b has substantially the same configuration as the first hydraulic pump body 320a. Accordingly, with regard to constituent elements of the second hydraulic pump body 320b, a last reference symbol "a" in the first hydraulic pump body 320a is replaced by reference symbol "b" in the drawings, and its detailed description will be appropriately omitted.

Herein, the pump case 150 will be described.

The pump system 100 according to this embodiment has a first pump case 150a surrounding the first hydraulic pump body 320a, and a second pump case 150b surrounding the second hydraulic pump body 320b, as the pump case 150.

As described above, the first and second hydraulic pump bodies 320a and 320b are arranged so as to be positioned with the base housing 120 interposed therebetween.

Accordingly, the first and second pump cases 150a and 150b are respectively coupled to a first side and a second side of the base housing 120.

Specifically, as shown in FIGS. 5 and 7, the first pump case 150a has a first case body 160a in which a base end is coupled to the first end wall 122a and an opening capable of inserting the first hydraulic pump body 320a therethrough is provided in a tip end, and a first port block 170a detachably coupled to the first case body 160a so as to close the opening of the first case body 160a in a liquid tight manner.

Herein, the second pump case 150b has substantially the same configuration as the first pump case 150a except a point that the second pump case 150b is coupled to the second end wall 122b. Accordingly, with regard to constituent elements of the second pump case 150b, a last reference symbol "a" in the first pump case 150a is replaced by reference symbol "b" in the drawings, and its detailed description will be appropriately omitted.

The first case body 160a has an end face 161a coupled to the first end wall 122a, and a peripheral wall 162a extending in a pump axial direction from a peripheral edge of the end face 161a so as to surround the first hydraulic pump body 320a, and a free end side of the peripheral wall portion 162a is set to the opening.

In this embodiment, the end face 161a and the peripheral wall 162a are formed separately (see to FIG. 7); however, they can be of course integrally formed with each other.

As shown in FIG. 3, a pair of first hydraulic fluid passages 410a forming a part of the pair of first hydraulic fluid lines 400a are formed in the first port block 170a.

Each of the pair of first hydraulic fluid passages 410a has a first end fluidly connected to the first hydraulic pump body 320a via a kidney port provided in the first port block 170a, and a second end opened to an outer surface of the first port block 170a so as to form a first hydraulic fluid port 411a.

Further, as shown in FIG. 3, the first port block 170a is provided with a first charge oil passage 420a guiding charge oil sent from the auxiliary pump unit 500 to the pair of first hydraulic fluid passages 410a, and a first bypass oil passage 430a communicating between the pair of first hydraulic fluid passages 410a.

The first charge oil passage 420a has a first end opened to an outer surface of the first port block 170a so as to form a first charge port 421a, and a second end fluidly connected to each of the pair of first hydraulic fluid passages 410a via a check valve 425.

As shown in FIG. 5, in this embodiment, the first charge port 421a is provided on an end face in an opposite side to a connection face to the first case body 160a in the outer surface of the first port block 170a.

The first bypass oil passage 430a has a first end opened to one side face (one side face orthogonal to the end face) of the first port block 170a. A switching valve 435 which communicates/shuts off the first bypass oil passage 430a is inserted through the opening in a state of being operatable manner from outsides.

As shown in FIG. 8, the PTO shaft 610 is supported by the first PTO clutch region 124a in the first end wall 122a and the second PTO clutch region 124b in the second end wall 122b in a rotatable manner around its axis.

In this embodiment, the PTO shaft 610 has a first end (a rear end in the illustrated embodiment) supported by the lid member 130 closing the opening provided in the PTO clutch region 124a in a liquid tight manner, and a second end (a front end in the illustrated embodiment) supported by the second PTO clutch region 124b.

The PTO clutch mechanism 650 is accommodated in the PTO clutch accommodating space 110C in a state of being supported by the PTO shaft 610.

Specifically, the PTO clutch mechanism 650 has a driving-side member 651 which is supported on the PTO shaft 610 in a relatively rotatable manner and is operatively connected to the input shaft 210 via the power transmission gear train 250.

More specifically, in this embodiment, as shown in FIG. 8, the power transmission gear train 250 has a third transmission gear 253 meshed with the first transmission gear 251, in addition to the first and second transmission gears 251 and 252.

Further, the driving-side member 651 is configured in a relatively non-rotatable manner with respect to the third transmission gear 253. In this embodiment, the driving-side member 651 and the third transmission gear 253 are integrally formed.

Further, the PTO clutch mechanism 650 has a driving-side friction plate 652 engaged with the driving-side member 651 in a relatively non-rotatable manner and in a movable manner in an axial direction, a driven-side member 653 supported on the PTO shaft 610 in a relatively non-rotatable manner, a driven-side friction plate 654 which is mounted on the driven-side member 653 in a relatively non-rotatable manner and in a movable manner in an axial direction, and is arranged so as to oppose to the driving-side friction plate 653, and a clutch member 655 switching a friction engagement/disengagement of the driving-side friction plate 652 and the driven-side friction plate 654.

The clutch member 655 has a piston member 656 frictionally engaging the driving-side friction plate 652 and the driven-side friction plate 654, and a biasing member 657 biasing the piston member 656 in a direction of moving the piston member 657 apart from the driving-side friction plate 652 and the driven-side friction plate 654. Herein, the piston member 656 brings the driving-side friction plate 652 and the driven-side friction plate 654 into friction contact with each other against the biasing force of the biasing member 657 by means of a hydraulic action, so that the power is transmitted to the driven-side friction member 653 from the driving-side member 651.

Further, the pump system 100 according to this embodiment includes a PTO brake mechanism 660 applying a braking force to the PTO shaft 610 contradictory against the PTO clutch mechanism 650.

In other words, the PTO brake mechanism 660 operatively applies the braking force to the PTO shaft 610 when the driving-side friction plate 652 and the driven-side friction plate 654 are not engaged, and releases the braking force when the driving-side friction plate 652 and the driven-side friction plate 654 are engaged.

The pump system 100 has the following configuration for circulating the oil reserved within the housing 110 without additional member.

Figure 9:
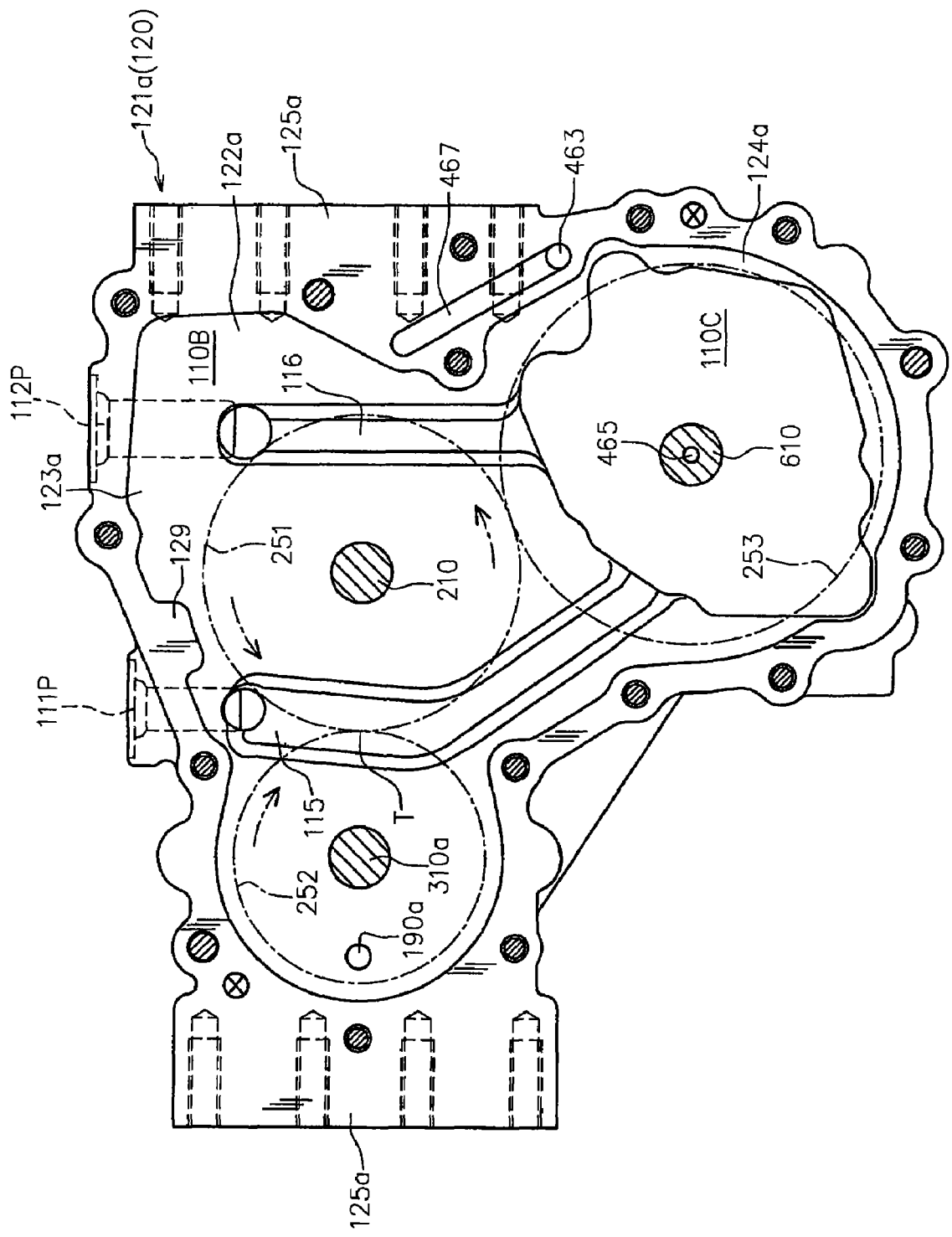
FIG. 9 is an end view of a first housing portion in the pump system taken along line IX-IX in FIG. 8.

FIG. 9 is an end view of the first housing portion 121a taken along line IX-IX in FIG. 8.

Specifically, in the pump system 100 according to this embodiment, as shown in FIGS. 7 and 8, an inner surface of the first gear region 123a defining the gear accommodating space 110B is close to first side faces of the first and second transmission gears 251 and 252, and an inner surface of the second gear region 123b defining the gear accommodating space 110B is close to second side faces of the first and second transmission gears 251 and 252.

Further, as shown in FIG. 9, one (the first suction/discharge port 111P) of the pair of first and second suction/discharge ports 111P and 112P is arranged within the gear accommodating space 110B so as to be positioned in an opposite side to the PTO clutch accommodating space 110C with the mesh point T between the first and second transmission gears 251 and 252 interposed therebetween.

With this configuration, it is possible to efficiently suck the oil into the PTO clutch accommodating space 110C or discharge the oil from the PTO clutch accommodating space 110C, by utilizing rotating motion of the first and second transmission gears 251 and 252.

In other words, for example, in the case that the first suction/discharge port 111P is used as the suction port (see FIG. 3), as in this embodiment, it is possible to promote to suck the oil from the first suction/discharge port 111P by setting the rotational direction of the first and second transmission gears 251 and 252 in such a manner that the first suction/discharge port 111P is positioned in an upstream side in the rotational direction of the first and second transmission gears 251 and 252 with reference to the mesh point T between the first and second transmission gears 251 and 252.

As is different from this, in the case that the first suction/discharge port 111P is used as the discharge port, it is possible to promote to discharge the oil from the first suction/discharge port 111P by setting the rotational direction of the first and second transmission gears 251 and 252 in such a manner that the first suction/discharge port 111P is positioned in a downstream side in the rotational direction of the first and second transmission gears 251 and 252 with reference to the mesh point T of the first and second transmission gears 251 and 252.

As described above, since the pump system 100 according to this embodiment has the aforementioned configuration, it is possible to promote to suck the oil into the PTO clutch accommodating space 110C or discharge the oil from the PTO clutch accommodating space 110C, so that it is possible to efficiently circulate the reserved oil within the PTO clutch accommodating space 110C so as to efficiently prevent the oil from being retained in the PTO clutch accommodating space 110C.

Accordingly, it is possible to improve a cooling efficiency of the PTO clutch mechanism 650 accommodated in the PTO clutch accommodating space 110C.

Preferably, as shown in FIGS. 7 and 9, it is possible to form a first oil groove 115 extending from the first suction/discharge port 111P to the PTO clutch accommodating space 110C via the mesh point T, at the inner surface of the first gear region 123a.

It is possible to efficiently obtain the pump action by the first and second transmission gears 251 and 252 by forming the first oil groove 115 so as to securely circulate the oil within the PTO clutch accommodating space 110C.

More preferably, as shown in FIG. 7, it is possible to form the first oil groove 115 extending from the first suction/discharge port 111P to the PTO clutch accommodating space 110C via the mesh point T, also at the inner surface of the second gear region 123b.

In this embodiment, the other (the second suction/discharge port 112P in the illustrated embodiment) of the pair of first and second suction/discharge ports 111P, 112P is provided so as to be opened to an inside of the gear accommodating space 110B (see FIG. 9).

Preferably, the second suction/discharge port 112P is arranged in such a manner that it is possible to promote to discharge/suck the oil from the second suction/discharge port 112P by utilizing rotating motion of any transmission gear forming the power transmission gear train 250.

Specifically, the second suction/discharge port 112P is arranged in the vicinity of an outer peripheral edge of one transmission gear (the first transmission gear 251 in this embodiment) forming the power transmission gear train 250.

As described above, in this embodiment, since the first suction/discharge port 111P is utilized as the suction port, the second suction/discharge port 112P is utilized as the discharge port.

Further, the second suction/discharge port 112P is positioned in the downstream side in the rotating direction of the one transmission gear (the first transmission gear 251 in this embodiment), so that it is possible to promote to discharge the oil reserved in the PTO clutch accommodating space 110C from the second suction/discharge port 112P, by utilizing the pump action by the one transmission gear.

More preferably, as shown in FIGS. 7 and 9, it is possible to form a second oil groove 116 extending from the PTO clutch accommodating space 110C to the second suction/discharge port 112P in a state of facing to the outer peripheral edge of the one transmission gear (the first transmission gear 251 in this embodiment), in the inner surface of the first gear region 123a and/or the inner surface of the second gear region 123b.

It is possible to efficiently obtain the pump action by the one transmission gear by forming the second oil groove 116.

In this embodiment, the second oil groove 116 is provided in both of the inner surface of the first gear region 123a and the inner surface of the second gear region 123b.

More preferably, in order to prevent the oil from directly communicating between the first suction/discharge port 111P and the second suction/discharge port 112P as much as possible, a partition portion 129 may be provided in an inner surface of the base housing 120 (see FIG. 9).

In this embodiment, as shown in FIG. 9, both of the first and second suction/discharge ports 111P and 112P are arranged so as to face an outer peripheral edge of the first transmission gear 251. Accordingly, the partition portion 129 is arranged as close as possible to the outer peripheral edge of the first transmission gear 251 between the first and second suction/discharge ports 111P and 112P.

With the provision of the partition portion 129, it is possible to effectively prevent the oil introduced into the base housing 120 from the first suction/discharge port 111P from being discharged from the second suction/discharge port 112P while bypassing the PTO clutch accommodating space 110C, and it is possible to improve a circulating efficiency of the oil reserved in the PTO clutch accommodating space 110C.

Further, the pump system 100 according to this embodiment can guide the leak oil from the first and second hydraulic pump bodies 320a and 320b to the PTO clutch accommodating space 110C so as to effectively prevent the leak oil from being retained in the pump case 150.

To be concrete, a first opening 190a for communicating an internal space of the first pump case 150a with an internal space of the base housing 120 is provided in the end face 161a of the first case body 150a and the first end wall 122a of the base housing 120.

In the same manner, a second opening 190b for communicating an internal space of the second pump case 150b with an internal space of the base housing 120 is provided in the end face 161b of the second case body 150b and the second end wall 122b of the base housing 120.

Preferably, the first and second openings 190a and 190b are opened to an inside of the gear accommodating space 110B, and are configured in such a manner that the leak oil from the first and second pump cases 150a and 150b are efficiently guided to the PTO clutch accommodating space 110C by utilizing the rotating motion of any transmission gear in the power transmission gear train 250.

In this embodiment, as well shown in FIG. 9, the first and second openings 190a and 190b are respectively arranged so as to face to a first side face and a second side face of the second transmission gear 252, and are configured in such a manner that the leak oil flows into the PTO clutch accommodating space 110C via the first oil groove 115 by utilizing the rotating motion of the second transmission gear 252.

Herein, a hydraulic circuit of the pump system 100 will be described.

The pump system 100 has an external reserve tank 900 in addition to the aforementioned configuration (see FIG. 3). The external reserve tank 900 forms an oil reservoir together with the housing 100.

The pump system 100 has a suction line 440 which fluidly connects the external reserve tank 900 and a suction port of the auxiliary pump body 510 and in which an oil filter 910 is inserted, a discharge line 450 fluidly connected to a discharge port of the auxiliary pump body 510, and the charge line 420, a PTO line 460 and a working machine line 470 which are branched from the discharge line 450, in addition to the pair of first hydraulic fluid lines 400a and the pair of hydraulic fluid lines 400b.

The suction line 440 has a suction conduit 441 fluidly connected to the external reserve tank 900, and a suction oil passage 442 formed in the auxiliary pump case 520.

The suction oil passage 442 has a first end opened to an outer surface of the auxiliary pump case 520 so as to form a suction port 440P, and a second end fluidly connected to a suction side of the auxiliary pump case body 510.

In this embodiment, the oil filter 910 is connected to the auxiliary pump case 520 so as to be inserted in the suction oil passage 442, as shown in FIG. 8, thereby intending to lighten a burden of a conduit work and a maintenance work.

The discharge line 450 has a discharge oil passage 451 formed in the auxiliary pump case 520.

The discharge oil passage 451 has a first end fluidly connected to a discharge side of the auxiliary pump body 510.

In this embodiment, a safety valve 920 is inserted in the discharge oil passage 451 (see FIG. 3), and relief oil from the safety valve 920 is returned to the oil reservoir (the base housing 120).

As shown in FIG. 3, the charge line 420 has a first end fluidly connected to the discharge line 450 via a resistance valve 930, and second ends fluidly connected to the pair of first hydraulic fluid lines 400a and the pair of second hydraulic fluid lines 400b via the check valves 425.

Specifically, the charge line 420 includes a charge supplying oil passage 422 which is formed in the auxiliary pump case 520 so as to have a first end communicated with the discharge oil passage 451 and a second end opened to the outer surface to form a charge supplying port 400 out, and in which the resistance valve 930 is inserted, the first charge oil passage 420a formed in the first port block 170a, a second charge oil passage 420b formed in the second port block 170b, a first charge conduit 423a fluidly connecting the charge supplying port 400 out to the first charge port 421a, and a second charge conduit 423b fluidly connecting the charge supplying port 400 out to a second charge port 421b.

Preferably, the first and second charge conduits 423a and 423b can have inner diameters, which are defined based on their lengths, respectively.

In other words, as shown in FIG. 5, the first port block 170a is positioned in an opposite side to the auxiliary pump unit 500 on the basis of the base housing 120, and the second port block 170b is positioned in the same side as the auxiliary pump unit 500 on the basis of the base housing 120.

In this configuration, the first charge conduit 423a becomes longer than the second charge conduit 423b.

Accordingly, in this embodiment, an inner diameter of the first charge conduit 423a is made larger than an inner diameter of the second charge conduit 423b, thereby lowering a loss pressure in the charge line 420 as much as possible.

The PTO line 460 has a first end fluidly connected to the discharge line 450 via an orifice 940, and a second end fluidly connected to the PTO clutch mechanism 650 (see FIG. 3).

Figure 10:
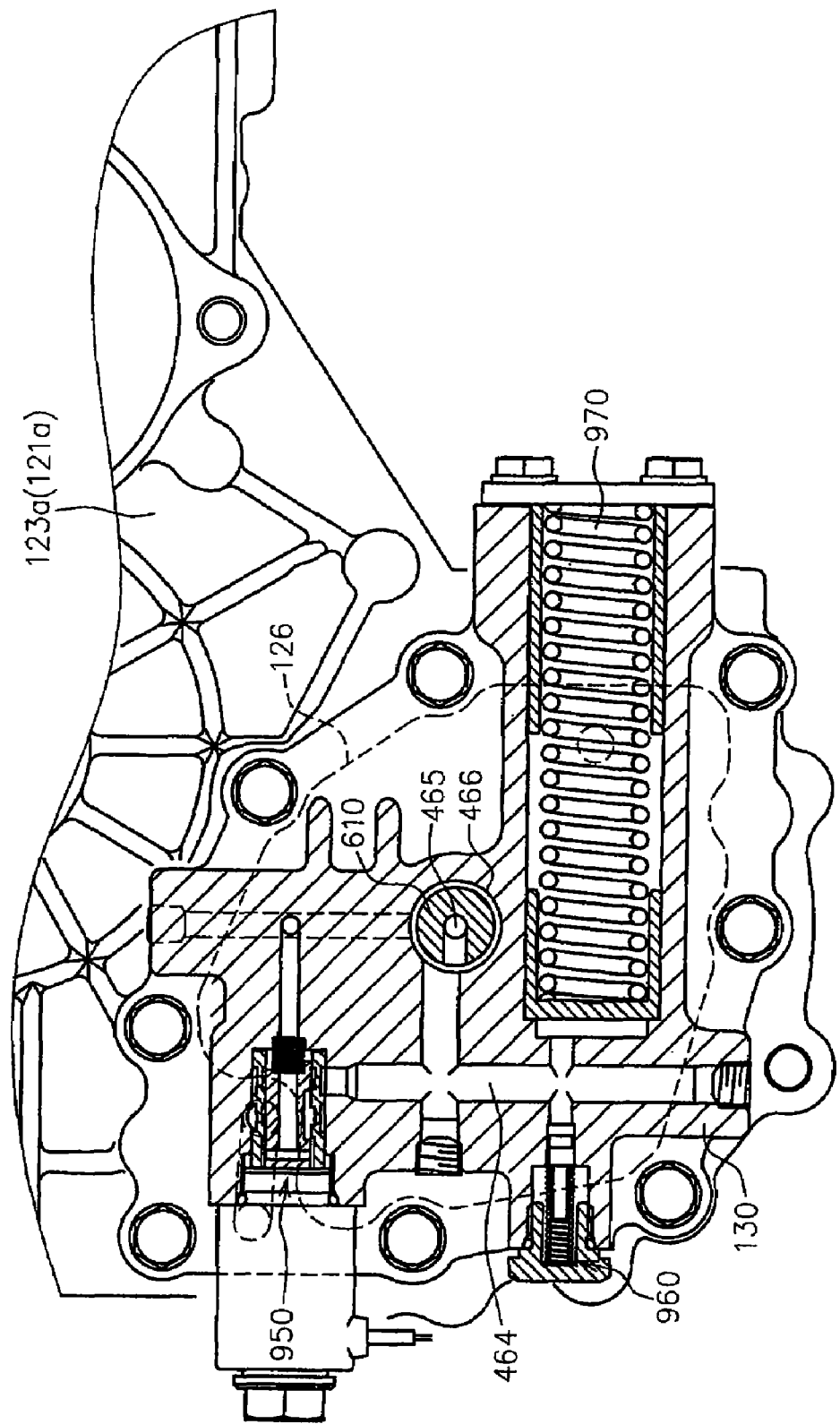
FIG. 10 is a cross sectional view of a lid member of the pump system taken along line X-X in FIG. 8.

FIG. 10 is a cross sectional view of the lid member 130 taken along line X-X in FIG. 8.

In this embodiment, the PTO line 460 has a first PTO oil passage 461 (see FIG. 7) which is formed in the auxiliary pump case 520 so as to have a first end communicated with the discharge oil passage 451 and a second end opened to a joint face with the second housing portion 121b, and in which the orifice 940 is inserted, a second PTO oil passage 462 (see FIG. 7) formed in the second housing portion 121b so as to have a first end opened to the joint face with the auxiliary pump case 520 so as to be communicated with the first PTO oil passage 461 and a second end opened to the joint face with the first housing portion 121a, a third PTO oil passage 463 (see FIGS. 7 and 8) formed in the first housing portion 121a so as to have a first end opened to the joint face with the second housing portion 121b and a second end opened to the joint face with the lid member 130, a communication groove 467 (see FIG. 9) provided in the joint face of the first housing portion 121a and the second housing portion 121b so as to communicate the second PTO oil passage 462 and the third PTO oil passage 463, a fourth PTO oil passage 464 (see FIGS. 8 and 10) formed in the lid member 130 so as to have a first end communicated with the third PTO oil passage 463, an axial hole 465 (see FIGS. 8 and 10) perforated in the PTO shaft 610, and a rotary joint 466 (see FIGS. 8 and 10) formed between an inner surface of the support hole of the lid member 130 and an outer surface of the PTO shaft 610 so as to fluidly connect the fourth PTO oil passage 464 and the axial hole 465.

As described above, in this embodiment, the PTO line 460 is constituted by the respective oil passages formed in the auxiliary pump case 520, the base housing 120 and the lid member 130, thereby intending to achieve a structure without conduits.

Herein, the lid member 130 is provided with a PTO clutch ON/OFF valve 950, a relief valve 960 for setting a PTO clutch operating pressure and an accumulator 970 so that they are inserted in the fourth PTO oil passage 464, as shown in FIGS. 3 and 10.

The working machine line 470 is formed, as shown in FIG. 3, such that the pressure oil in the discharge line 450 can be supplied to a working machine hydraulic mechanism (a mower elevating hydraulic mechanism 75 in this embodiment).

In this embodiment, the working machine line 470 has a working machine supply line 470a having a first end fluidly connected to the discharge line 450 via a charge relief valve 980 and a second end fluidly connected to the working machine hydraulic mechanism 75, and a return line 480b having a first end fluidly connected to the working machine hydraulic mechanism 75 and a second end fluidly connected to the first suction/discharge port 111P in the base housing 120.

Specifically, the working machine supply line 470a has a working machine oil passage 471 formed in the auxiliary pump case 520 so as to have a first end communicated with the discharge oil passage 451 and a second end opened to the outer surface to form the working machine port 470P, and a supply conduit 472 extending between the working machine port 470P and the working machine hydraulic mechanism 75.

Herein, the charge relief valve 980 is installed in the auxiliary pump case 520 so as to be inserted in the working machine oil passage 471.

The return line 470b has a return conduit 473 having a first end fluidly connected to the working machine hydraulic mechanism 75 and a second end fluidly connected to the first suction/discharge port 111P.

As shown in FIG. 3, in this embodiment, an oil cooler 990 is inserted in the return conduit 473, and it is possible to further improve a cooling efficiency of the PTO clutch mechanism 650 by returning the cooled oil to the base housing 120.

In this embodiment, the pump system 100 is configured such that the first and second hydraulic pump bodies 320a and 320b are tandem arranged along the axial direction of the pump shaft; however, the first and second hydraulic pump bodies 320a and 320b may be arranged or positioned in parallel in place thereof.

Figure 19:
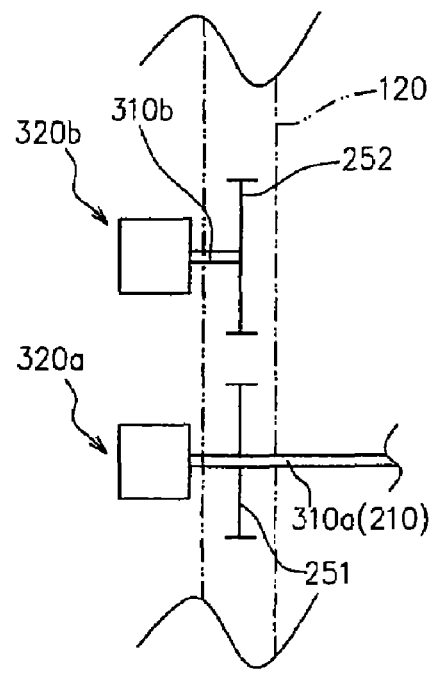
FIG. 19 is a schematic side view of first and second hydraulic pump bodies positioned in parallel, in accordance with one embodiment of the present invention.
Figure 20:
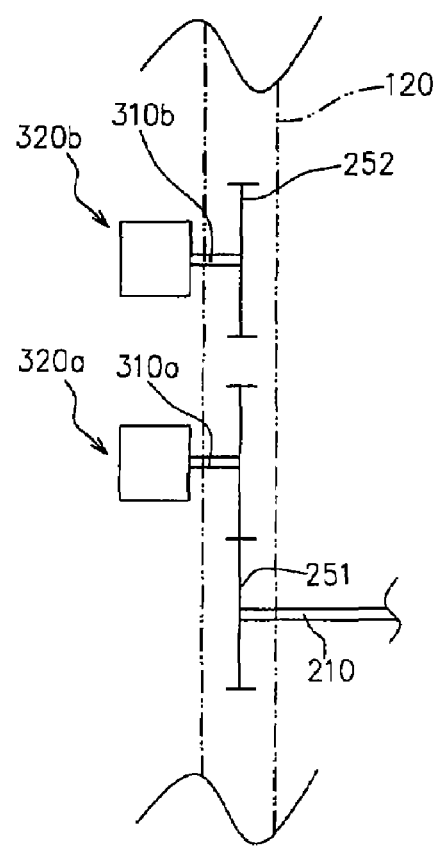
FIG. 20 is a schematic side view of first and second hydraulic pump bodies positioned in parallel, in accordance with another embodiment of the present invention.

In the aspect in which the first and second hydraulic pump bodies 320a and 320b are arranged in parallel, the first and second pump shafts 310a and 310b are arranged in parallel to each other. In the case that the first and second pump shafts are arranged in parallel, it is possible to use any one of the first and second pump shafts 310a and 310b as the input shaft 210 (see FIG. 19), or to use an independent input shaft 210 which is separate from the first and second pump shafts 310a and 310b as the input shaft 210 (see FIG. 20).

Further, in this embodiment, two hydraulic pump bodies (the first and second hydraulic pump bodies 320a and 320b) are provided; however, only one hydraulic pump body may be provided, or three or more hydraulic pump bodies may be provided, in place thereof.

Embodiment 2

A preferred embodiment of an axle-driving system according to another aspect of the present invention will be described below with reference to the accompanying drawings.

An axle-driving system according to the present invention includes a motor unit which forms a non-stepwise speed change in cooperation with an actuator such as a hydraulic pump unit and drives a corresponding drive axle, so that the axle-driving system drives the corresponding drive axle with changing its rotational speed in cooperation with the actuator.

It should be noted that this embodiment is described with an example in which a hydraulic pump unit is used as the actuator and a hydraulic motor unit which constitutes HST in cooperation with the hydraulic pump unit is used as the motor unit. However, an axle-driving system according to the present invention also covers an embodiment in which an electric motor unit is used as the motor unit. When such an electric motor unit is used, an electric generator or the like is used as the actuator.

First, a mode of a vehicle to which axle-driving systems 10, 20 according to this embodiment are applied will be described.

Figure 11:
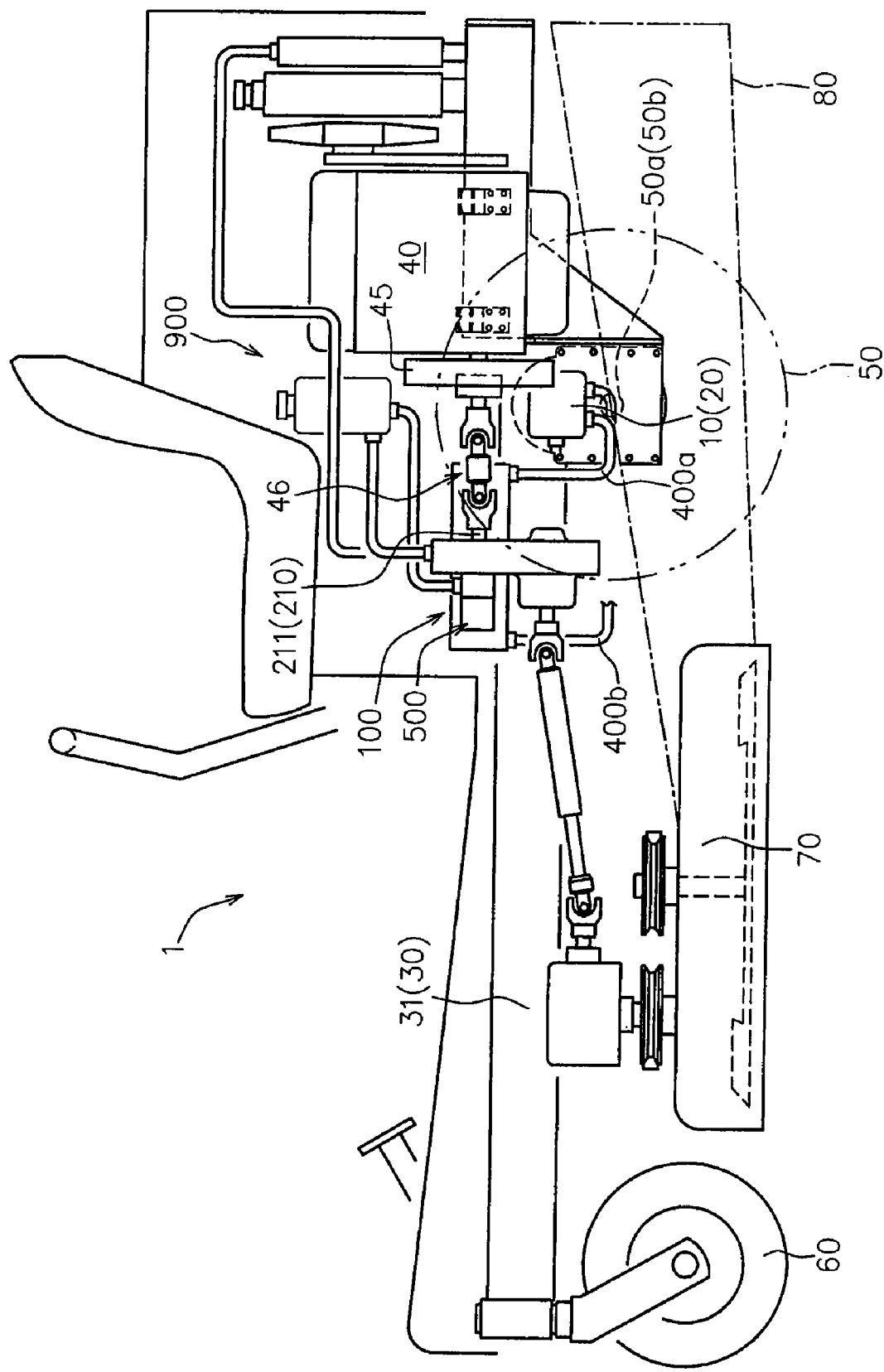
FIG. 11 is a schematic side view of a vehicle to which the axle-driving systems according to a second embodiment of the present invention are applied.
Figure 12:
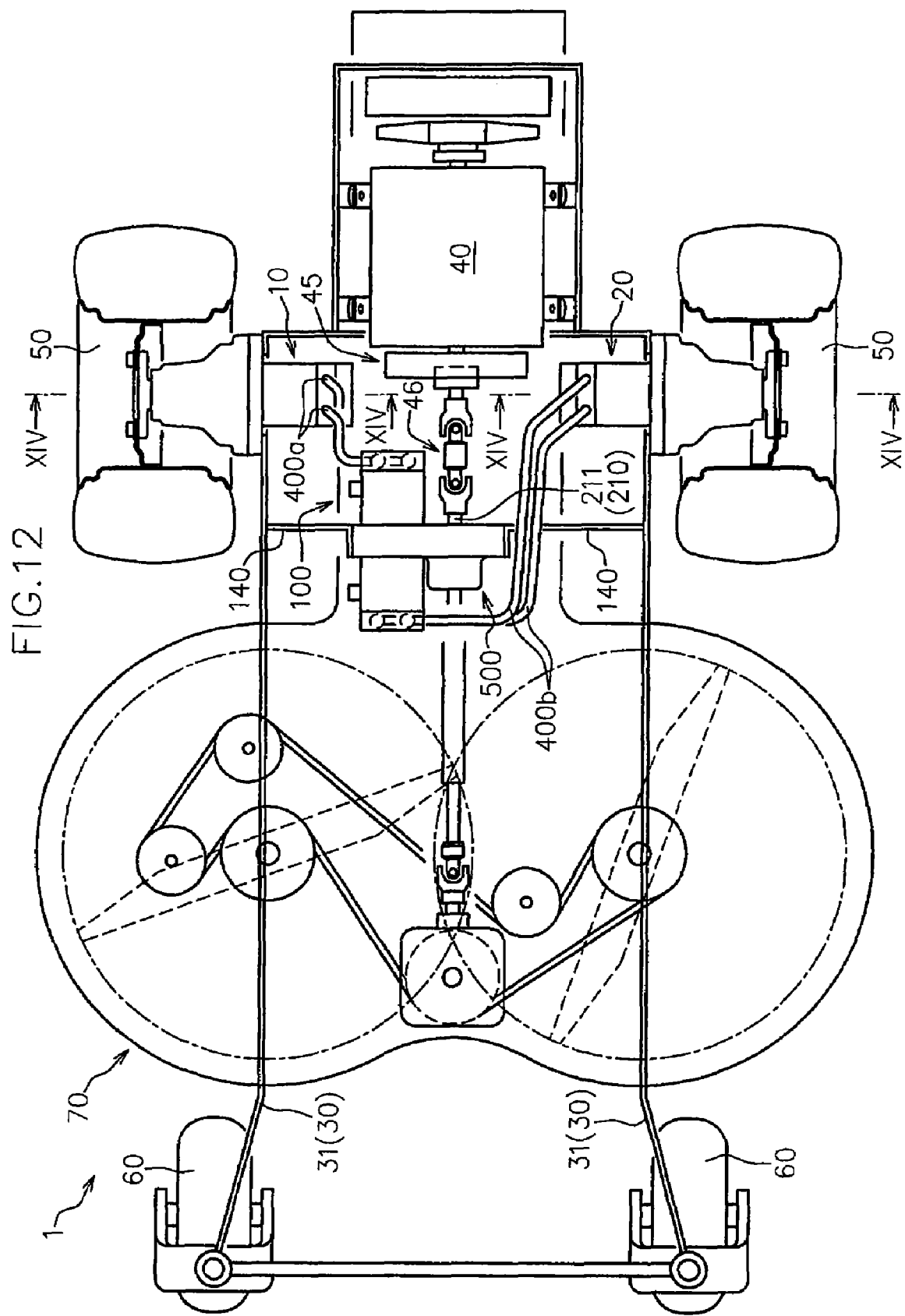
FIG. 12 is a schematic plan view of the vehicle shown in FIG. 11.
Figure 13:
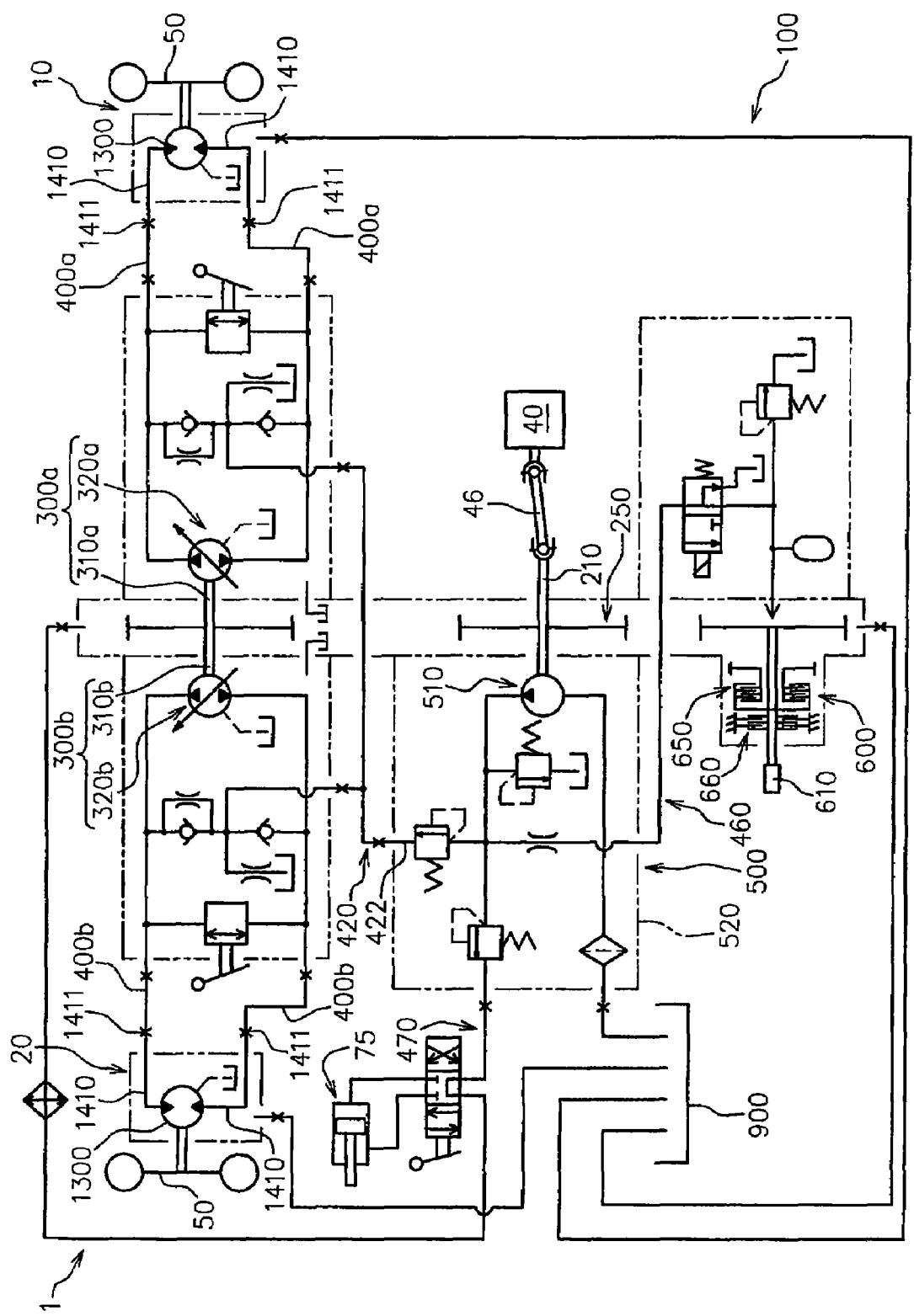
FIG. 13 is a hydraulic circuit diagram of the vehicle 1 shown in FIGS. 11 and 12.

FIGS. 11-13 are a schematic side view, a schematic plan view and a hydraulic circuit diagram, respectively, of a vehicle 1 to which the axle-driving systems 10, 20 according to this embodiment are applied.

As shown in FIGS. 11 and 12, the vehicle 1 includes a vehicle frame 30 having a pair of main frames 31 arranged along the longitudinal direction of the vehicle; an engine 40 which is supported on the vehicle frame 30; a hydraulic pump system 100 which receives the output from the engine 40 via a flywheel 45; a pair of driving wheels 50; a pair of first and second drive axles 50a, 50b which are connected to each of the pair of the driving wheels 50 in a non-rotatable manner around its axis; and first and second axle-driving systems 10, 20 according to this embodiment, which are so constructed as to drive the first and second drive axles 50a, 50b independently.

It should be noted that in the embodiment shown in the Fig., the vehicle 1 includes a caster wheel 60 supported to the front of the vehicle frame 30, a mower 70 installed between the caster wheel 60 and the driving wheels 50 with respect to the longitudinal direction of the vehicle 1; and a discharge duct 80 forming a conveyance path for conveying the grass mowed by the mower 70 rearwardly of the vehicle, in addition to the above-mentioned construction.

As shown in FIGS. 11 and 12, the engine 40 is supported in a vibration-absorbing manner on the pair of main frames 31 to the rear of the drive axles 50a, 50b via a vibration-absorbing rubber.

In the form shown in the Figs., the engine 40 is supported on the pair of main frames 31 at four front, rear, right and left points via vibration-absorbing rubbers.

As shown in FIGS. 11 and 12, the hydraulic pump system 100 is supported on the pair of main frames 31 via attachment stays 140 to the front of the engine 40.

As shown in FIGS. 11 to 13, the hydraulic pump system 100 includes an input shaft 210 having an input end 211 which is operatively connected to the engine 40 via the flywheel 45 and a transmission shaft 46 with a universal joint; a first hydraulic pump unit 300a which acts as a power source for a motor unit 1050 described later in the first axle-driving system 10; a second hydraulic pump unit 300b which acts as a power source for the motor unit 1050 described below in the second axle-driving system 20; a PTO unit 600 which acts as a power source for a working device (the mower 70 in this embodiment) attached to the working vehicle 1; and a power transmission gear train 250 which transmits power from the input shaft 210 to the first and second hydraulic pump units 300a, 300b and to the PTO unit 600.

The first and second hydraulic pump units 300a, 300b form first and second HSTs, respectively, in cooperation with the hydraulic motor units in the first and second axle-driving systems 10, 20.

Specifically, as shown in FIG. 13, the first hydraulic pump unit 300a, includes a first pump shaft 310a which is operatively connected to the input shaft 210 via the power transmission gear train 250; and a first hydraulic pump body 320a driven by the first pump shaft 310a.

As described below, the first hydraulic pump body 320a and a hydraulic motor body 1300 in the first axle-driving system 10 are hydraulically connected via a pair of first hydraulic fluid lines 400a, and at least one of these is of variable-displacement type.

Likewise, as shown in FIG. 13, the second hydraulic pump unit 300b includes a second pump shaft 310b which is operatively connected to the input shaft 210 via the power transmission gear train 250; and a second hydraulic pump body 320b driven by the second pump shaft 310b.

The second hydraulic pump body 320b and a hydraulic motor body 1300 described later in the second axle-driving system 20 are hydraulically connected via a pair of second hydraulic fluid lines 400b, and at least one of these is of variable-displacement type.

It should be noted that in this embodiment, the first and second hydraulic pump bodies 320a, 320b are of variable-displacement type, and the first and second hydraulic motor bodies, of which details are described later, are of fixed-displacement type.

As shown in FIG. 13, the PTO unit 600 includes a PTO shaft 610; a PTO clutch mechanism 650 inserted between the power transmission gear train 250 and the PTO shaft 610; and a PTO brake mechanism 660 which counteracts the PTO clutch mechanism 650.

It should be noted that the pump system 100 shown in FIGS. 11 to 13 includes an auxiliary pump unit 500 operatively driven by the input shaft 210 in addition to the above construction.

More specifically, the auxiliary pump unit 500 includes a main auxiliary pump body 510 which is operatively driven by the input shaft 210; and an auxiliary pump case 520 surrounding the main auxiliary pump body 510 (refer to FIG. 13).

In this embodiment, as shown in FIG. 13, the pressure oil from the auxiliary pump unit 500 is distributively supplied to a charge line 420 for supplying pressure oil to the pair of the first hydraulic fluid lines 400a and the pair of second hydraulic fluid lines 400b; a PTO line 460 for supplying hydraulic oil to the PTO clutch mechanism 650 and the PTO brake mechanism 660; and a working device line 470 for supplying hydraulic oil to a hydraulic mechanism 75 for a working device.

The numeral 900 in FIGS. 11 and 13 denotes an external reserve tank provided separately from the pump system 100. The auxiliary pump unit 500 suctions oil from the external reserve tank 900.

Next, the first axle-driving system 10 will be described.

Figure 14:
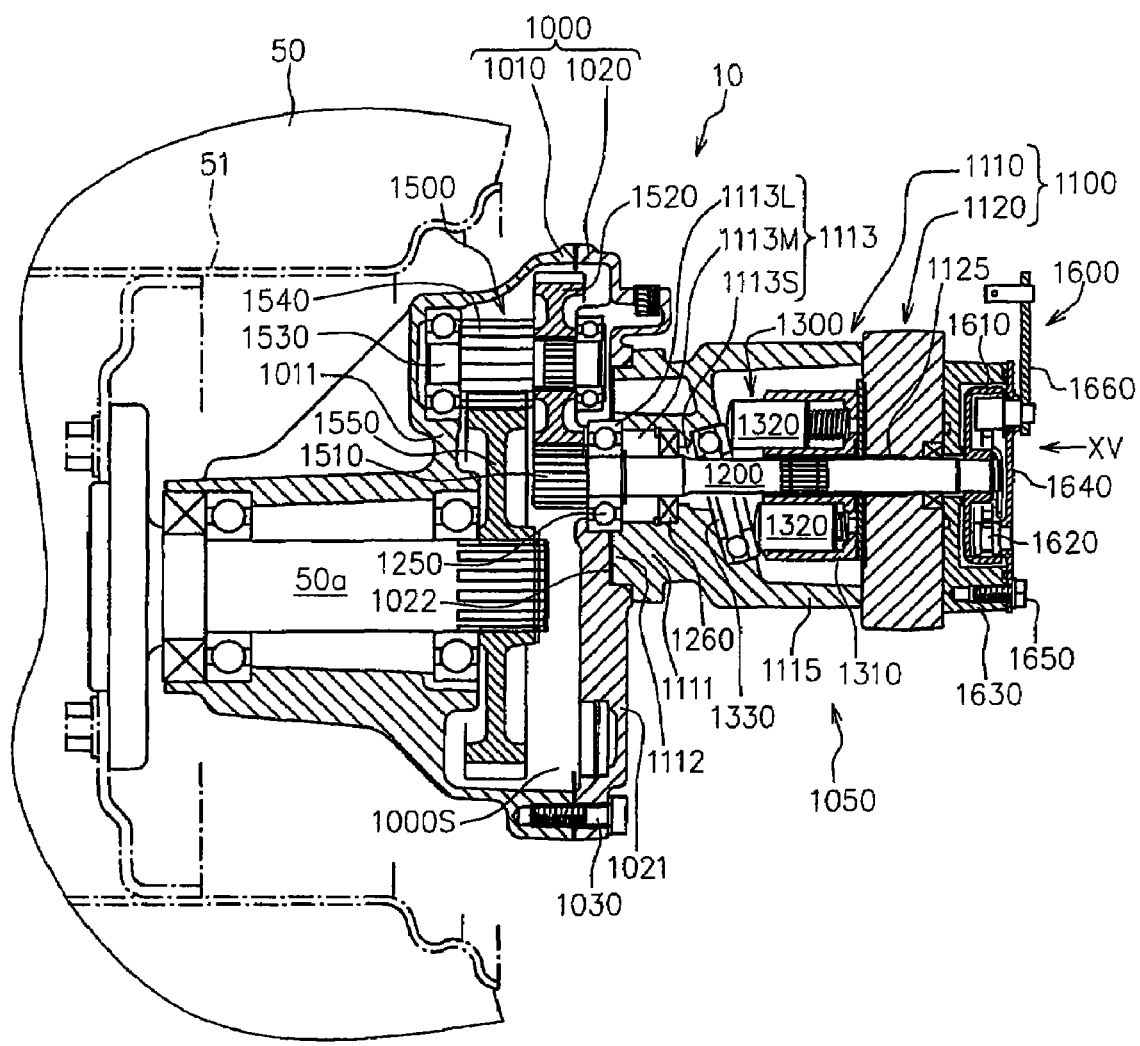
FIG. 14 is a front sectional view of the first axle-driving system of the second embodiment along the line XIV-XIV in FIG. 12.
Figure 15A:
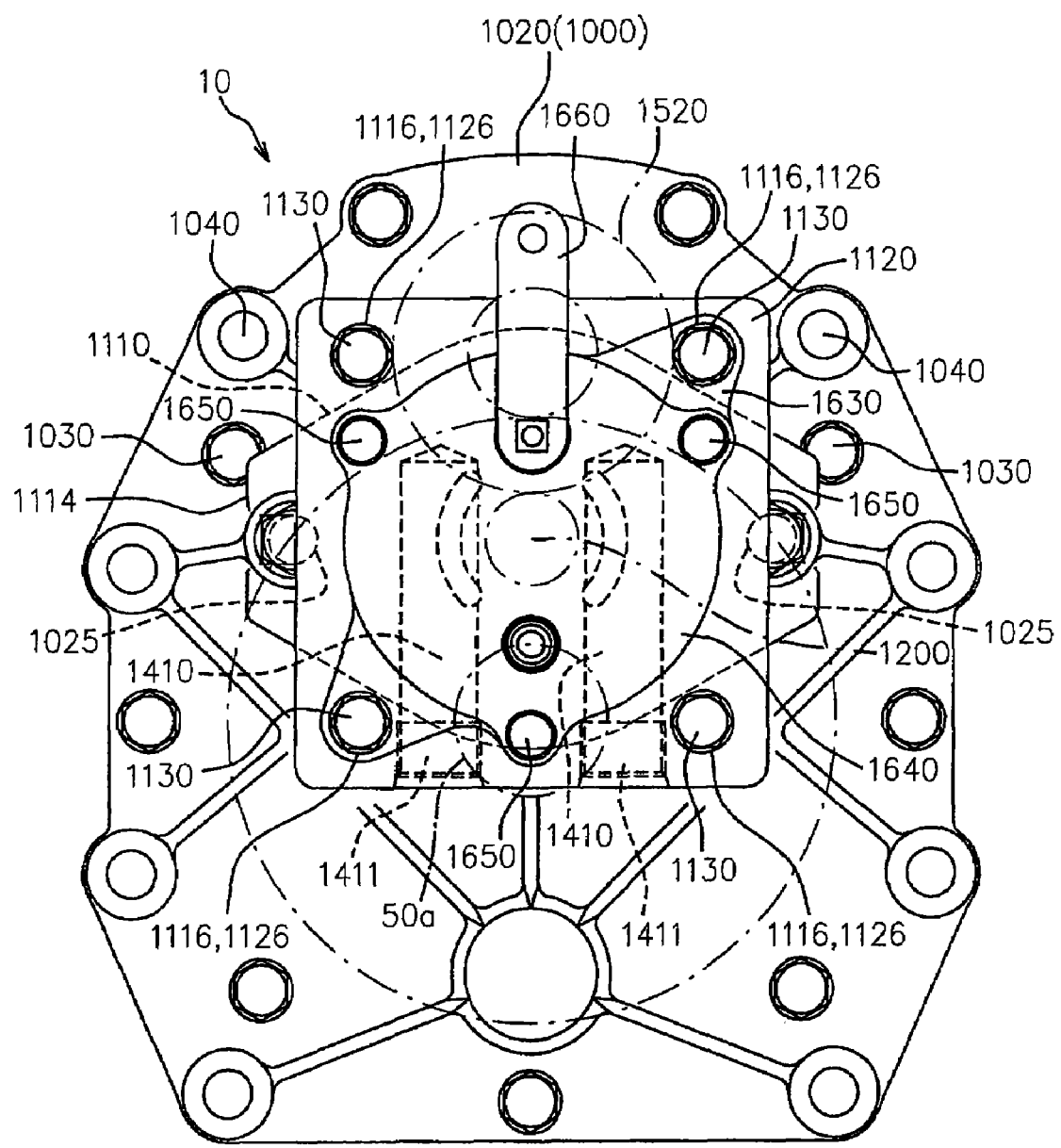
FIG. 15A is an end view of the first axle-driving system along the line XV in FIG. 14.

FIG. 14 shows a front sectional view of the first axle-driving system 10 along the line XIV-XIV in FIG. 12. FIG. 15A shows an end view of the first axle-driving system 10 along the line XV in FIG. 14.

As shown in FIG. 14 and FIG. 15A, the first axle-driving system 10 includes an axle case 1000 which rotatably supports the corresponding first drive axle 50a around the axis: the hydraulic motor unit 1050 connected to and supported by the axle case 1010; and a reduction transmission unit 1500 which transmits the output of the hydraulic motor unit 1100 to the first drive axle 50a with reducing its rotational speed.

As shown in FIG. 14, the axle case 1000 is so constructed that it is connected to the corresponding main frame 31 in such a state that it is situated outwardly of the corresponding main frame 31 in the widthwise direction of the vehicle via a suitable attachment stay (not shown).

As mentioned above, disposing the axle case 1000 outwardly of the corresponding main frame 31 in the widthwise direction of the vehicle ensures a free space between the pair of main frames 31. Therefore, the modifications between a center discharge type (refer to FIG. 11) in which the discharging duct 80 for the mower 70 is disposed between the pair of drive axles 50a, 50b, and other types such as a side discharge type can be easily performed.

More specifically, the axle case 1000 includes an outer wall 1011 which supports the corresponding drive axle (the first drive axle 50a in the first axle-driving system 10) in a rotatable manner around the axis; and an inner wall 1021 which is disposed apart from the outer wall 1011 inwardly in the widthwise direction of the vehicle so that the inner end portion of the corresponding drive axle is situated between the inner wall 1021 and the outer wall 1011.

Specifically, the first axle case 1000 is so configured that an accommodating space 1000S is defined by the outer wall 1011 and the inner wall 1021, causing the inner end portion of the corresponding drive axle to be positioned inside the accommodating space 1000S.

In this embodiment, the axle case 1000 has an outer member 1010 which has the outer wall 1011; and an inner member 1020 which has the inner wall 1021. The outer member 1010 and the inner member 1020 are detachably connected by a fastening member 1030 such as a bolt.

It should be noted that the numeral 1040 in FIG. 15A denotes frame mounting seats formed on the outer surface of the inner wall 1021, and the attachment stays are connected to the frame mounting seats 1040.

The hydraulic motor unit 1050 is hydraulically connected to the corresponding hydraulic pump unit to form an HST in cooperation with the corresponding hydraulic pump unit via a pair of hydraulic fluid lines.

The hydraulic motor unit 1050 in the first axle-driving system 10 is, as mentioned above, hydraulically connected to the first hydraulic pump unit 300a via the pair of the first hydraulic fluid lines 400a to form a closed circuit, constituting the first HST in cooperation with the first hydraulic pump unit 300a.

More specifically, as shown in FIG. 14, the hydraulic motor unit 1050 has a motor case 1100 connected to the inner wall 1021 of the axle case 1000; a motor shaft 1200 which is supported by the motor case 1100 in a rotatable manner around the axis and has an outer end portion in the widthwise direction of the vehicle is positioned inside the accommodating space 1000S of the axle case 1000; a hydraulic motor body 1300 which is accommodated in the motor case 1100 and rotationally drives the motor shaft 1200.

The motor case 1100 has a motor case body 1110 detachably coupled to the inner wall 1021 of the axle case 10a; and a port block 1120 detachably connected to the motor case body 1110.

The motor case body 1110 has an end wall 1111 in contact with the inner wall 1021; and a peripheral wall 1115 extending inwardly in the widthwise direction of the vehicle from the peripheral edge of the end wall 1111, and its end face on the opposite side of the inner wall 1021 is opened.

Preferably, the end wall 1111 is so configured to be in a concave-convex engagement with the inner wall 1021.

Such a construction allows accurate positioning of the motor case body 1110 with respect to the axle case 1000.

In this embodiment, a projection 1112 is provided on the end wall 1111, and a corresponding recess 1022 is provided on the inner wall 1021.

The port block 1120 is detachably coupled to the motor case body 1110 in a manner of closing the opening of the motor case body 1110 via a fastening member 1130 such as a bolt.

As shown in FIGS. 13-15A, the port block 1120 is provided with a pair of first hydraulic fluid passages 1410 constituting a part of the pair of the first hydraulic fluid lines 400a.

The pair of first hydraulic fluid passages 1410 have first ends opened to the inner surface (the surface facing the accommodating space of the motor case body 1110) of the port block 1120 so as to form a pair of kidney ports which are fluidly communicated with a suction side and a discharge side of the hydraulic motor body 1300, and second ends opened to the outer surface of the port block 1120 so as to form a pair of hydraulic fluid ports 1411 for the corresponding first hydraulic pump unit 300a.

The motor shaft 1200 is supported by the end wall 1111 of the motor case body 1110 and the port block 1120 in a rotatable manner around the axis.

More specifically, the motor shaft 1200 is rotatably supported around the axis by a bearing member 1250 disposed in a through-hole 1113 formed on the end wall 1111 and a bearing hole 1125 formed in the port block 1120.

Preferably, as shown in FIG. 14, the through-hole 1113 can have a central portion 1113M; and a large diameter portion 1113L which is enlarged from the central portion 1113M with a step and is opened outwardly in the widthwise direction of the vehicle.

The bearing member 1250 is disposed in the large diameter portion 1113L so that at least part of it is protruded outwardly of the end wall 1111 in the widthwise direction of the vehicle, and the inner wall 1021 is provided with a recess 1023 engaging with the protruding portion of the bearing member 1250 on its outer surface (the surface facing the end wall 1111).

Such a construction allows the bearing member 1250 to be also used as a positioning member of the motor case body 1110 with respect to the axle case 1000.

More preferably, the motor case body 1110 can be provided with a sealing member 1260 which seals the through-hole 1113 in a liquid tight manner.

In this embodiment, as shown in FIG. 14, the through-hole 1113 has a small diameter potion 1113S which is contracted from the central portion 1113M with a step and is opened to the accommodating space of the motor case body 1110. The sealing member 1260 is disposed in the small diameter potion 1113S.

Such a construction enables the inner space of the motor case 1100 to be effectively used as an oil reservoir, and can effectively prevent the leak oil of the hydraulic motor body 1300 from being leaked to the outside of the motor case 1100.

The hydraulic motor body 1300 includes a cylinder block 1310 which is relatively non-rotatably supported on the motor shaft 1200 so as to be situated within the inner space defined by the motor case body 1110 and the port block 1120 and which is fluidly connected to the pair of first hydraulic fluid passages 1410; a piston 1320 which is accommodated relatively non-rotatably and reciprocally in the cylinder block 1310; and an output adjustment member 1330 which defines the reciprocating range of the piston 1320.

As mentioned above, in this embodiment, the hydraulic motor body 1300 is of a fixed-displacement type. Therefore, the hydraulic motor body 1300 includes a fixed swash plate as the output adjustment member 1330.

Such a hydraulic motor body 1300 is so constructed that the hydraulic fluid supplied and discharged via the pair of the first hydraulic fluid lines 400a cause the piston 1320 to be reciprocated within the cylinder block 1310 and to be rotated around the motor shaft 1200, whereby the cylinder block 1310 and the motor shaft 1200 are rotated around the axis.

The reduction transmission unit 1500 includes an output gear 1510 ditched on the motor shaft 1200 at its outer end portion in the widthwise direction of the vehicle; a first intermediate gear 1520 meshing with the output gear 1510; an intermediate shaft 1530 provided with the first intermediate gear 1520 and supported by the axle case 1000; a second intermediate gear 1540 provided non-rotatably relatively to the intermediate shaft 1530; and a final gear 1550 which meshes with the second intermediate gear 1540 and is relatively non-rotatably supported on the corresponding drive axle 50*a* at its inner end portion in the widthwise direction of the vehicle. The thus reduction transmission unit 1500 can transmit the rotational power from the motor shaft 1200 to the corresponding drive axle 50*a* with reducing the rotational speed.

As mentioned above, the first axle-driving system 10 according to this embodiment includes the reduction transmission unit 1500 between the hydraulic motor unit 1050 and the corresponding drive axle 50*a*. Therefore, in the first axle-driving system 10, a motor unit of a low-torque and high-speed type, which is highly reliable, can be used as the hydraulic motor unit 1050.

As opposed to a high-torque and low-speed motor, the low-torque and high-speed motor has the advantages of smaller dimension, a smaller amount of hydraulic oil leaked and higher volume efficiency.

In addition, the first axle-driving system 10 according to this embodiment includes a brake unit 1600 which can apply brake force operatively to the corresponding first drive axle 50*a*.

The brake unit 1600 is so constructed that it can apply brake force to the motor shaft 1200, as shown in FIG. 14.

More specifically, as shown in FIG. 14, the motor shaft 1200 has the outer end portion in the widthwise direction of the vehicle and the inner end portion in the widthwise direction of the vehicle, both extending outwardly from the motor case 1100.

The brake unit 1600 is connected to the port block 1120 at its inner end face in the widthwise direction of the vehicle so that brake force can be applied to the motor shaft 1200 at its inner end portion in the widthwise direction of the vehicle.

As can be seen from the above, the axle-driving system 10 according to this embodiment is so constructed that brake force can be applied to the motor shaft 1200 with high speed and low torque before the rotational speed being decelerated by the reduction transmission unit 1500. The capacity and the cost of the brake unit 1600 can be thus reduced.

Based on this point, in this embodiment, the axle-driving system 10 includes an internal expanding brake unit as the brake unit 1600.

Figure 15B:
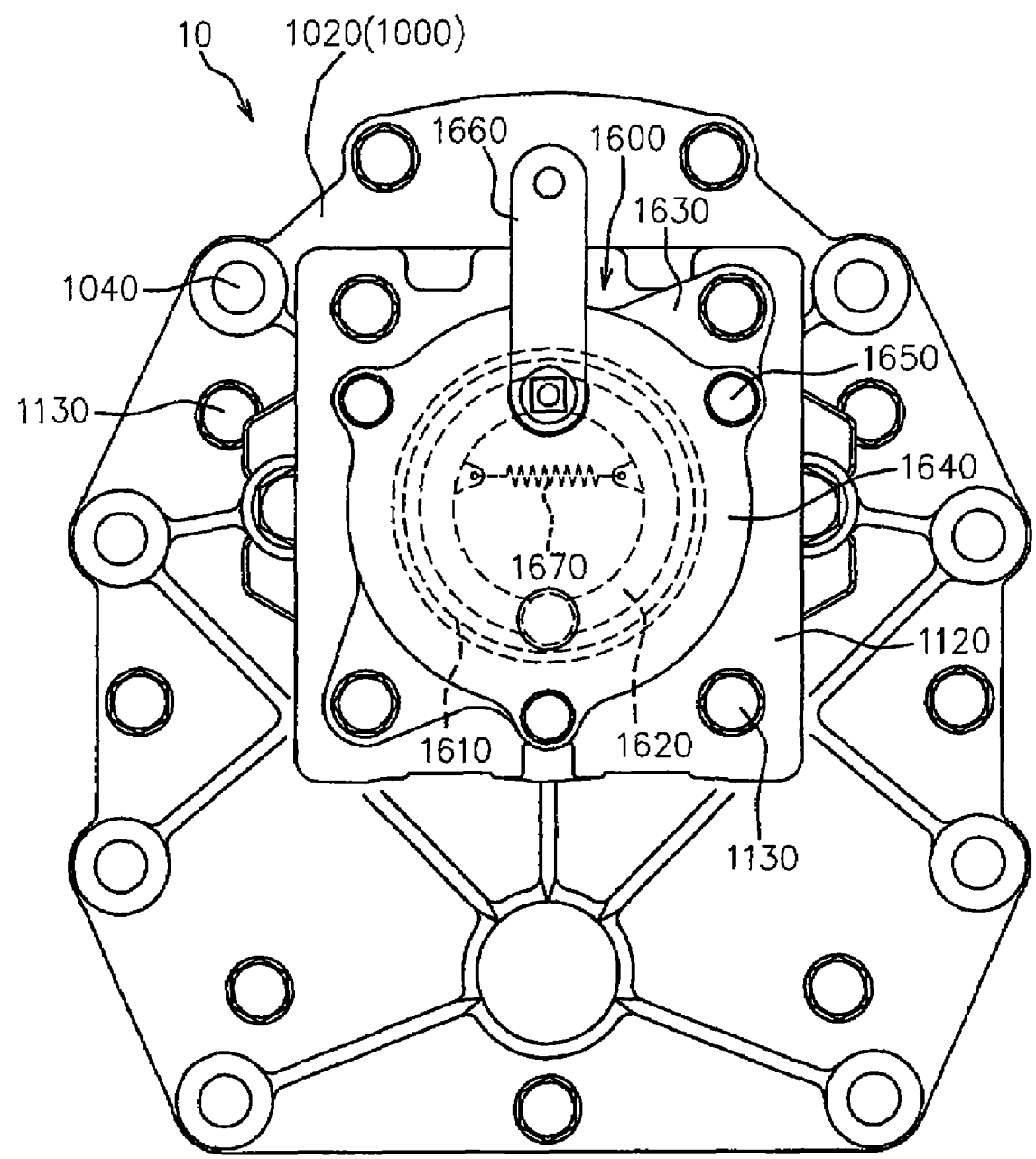
FIG. 15B is an end view of the first axle-driving system along the line XV in FIG. 14 in which the brake unit of the system is represented by a shadow line.

FIG. 15B shows an end view of the first axle-driving system 10 along the line XV in FIG. 14 in which the brake unit 1600 is represented by a shadow line.

Specifically, as shown in FIGS. 15A and 15B, the internal expanding brake unit has a brake case 1630 connected to the port block 1120 and provided with an opening at its inner end face in the widthwise direction of the vehicle; a brake drum 1610 accommodated in the brake case 1630 via the opening and relatively supported non-rotatably on the motor shaft 1200 at its inner end portion in the widthwise direction of the vehicle; a brake shoe 1620 disposed so as to face the inner peripheral surface of the brake drum 1610; a biasing member 1670 which biases the brake shoe 1620 away from the inner peripheral surface of the brake drum 1610; a brake cover 1640 which is detachably coupled to the brake case 1630 in a manner of closing the opening by a fastening member 1650 such as a bolt; and a brake operation arm 1660 which presses the brake shoe 1620 to the inner peripheral surface of the brake drum 1610 against the biasing force of the biasing member 1670.

The internal expanding brake unit is employed as the brake unit 1600 in this embodiment as mentioned above. It is needless to say, however, a disk brake unit or other brake unit can be also used.

In addition, as mentioned above, the axle-driving system 10 according to this embodiment is so constructed that brake force can be applied to the motor shaft 1200 at its inner end portion in the widthwise direction of the vehicle. Therefore, a brake unit need not be disposed inside the reduction transmission unit 1500.

Accordingly, the distances between the motor shaft 1200 and the intermediate shaft 1530 and corresponding drive axle 50*a* can be shortened. This can achieve the miniaturization of the entire axle-driving system, thereby, for example, accommodating the reduction transmission unit 1500 within a tire rim 51.

Subsequently, the second axle-driving system 20 will be described.

Figure 16:
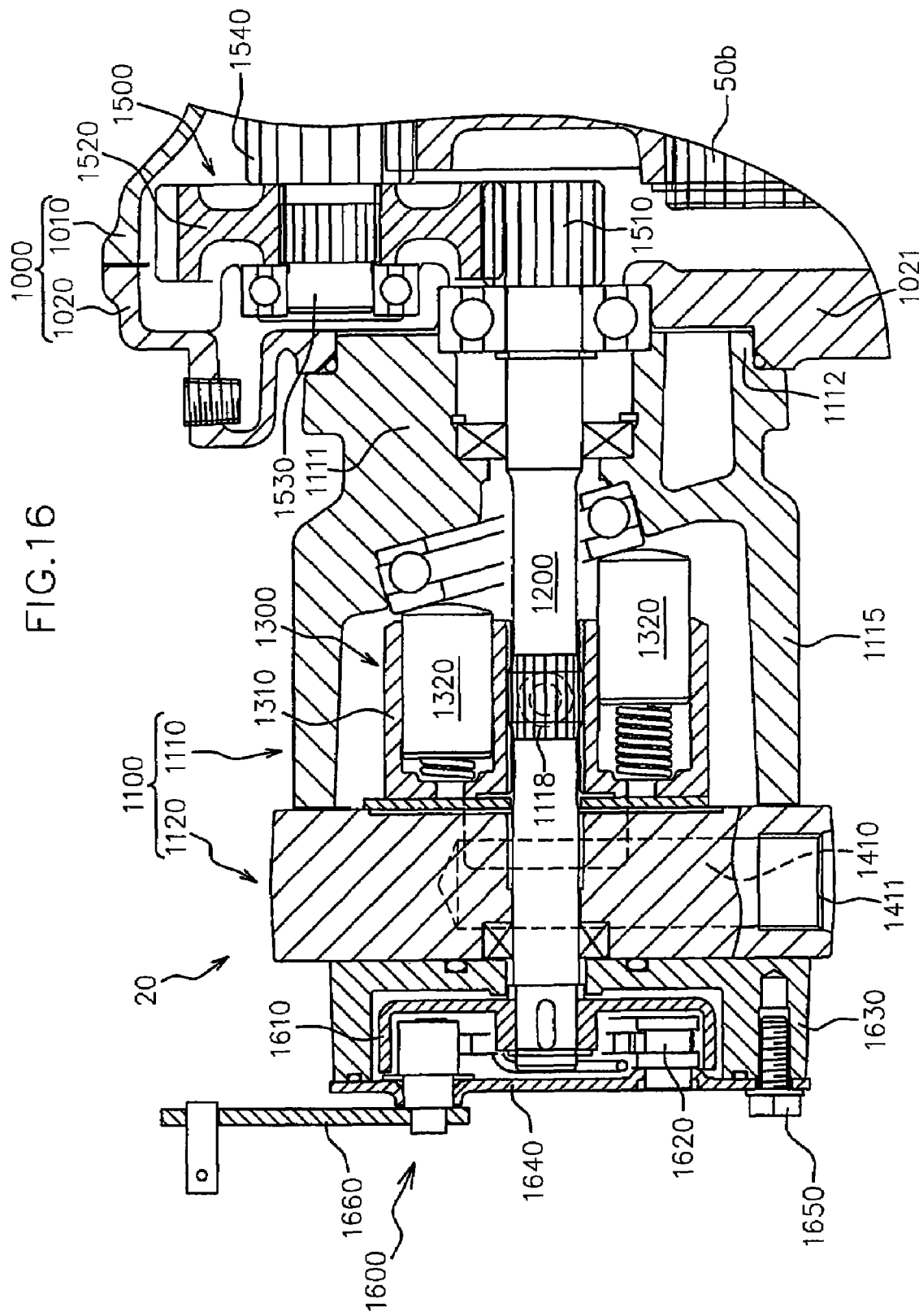
FIG. 16 is a front sectional view of the second axle-driving system of the second embodiment along the line XVI, XVI in FIG. 12.

FIG. 16 shows a front sectional view of the second axle-driving system 20 along the line XVI, XVI in FIG. 12.

As shown in FIG. 16, the second axle-driving system 20 has the identical construction to the first axle-driving system 10 except that it has a different connecting position of the motor case body 1110 with respect to the axle case 1000 and the port block 1120.

Specifically, the motor case body 1110 is constructed so as to be connectable with the axle case 1000 in both a first connecting position shown in FIG. 14 and a second connecting position shown in FIG. 16 which is circumferentially displaced by 180° from the first connecting position with respect to the motor shaft.

In this embodiment, as shown in FIG. 15A, threaded holes 1025, which are circumferentially displaced by 180° to each other based on the corresponding motor shafts 50*a*, 50*b*, are provided on the inner wall 1021 of the axle case 1000, and the motor case body 1110 is provided with mounting holes or mounting grooves 1114 corresponding to the threaded holes 1025.

In addition, the motor case body 1110 is connectable to the port block 1120 without changing the direction of a pair of hydraulic fluid ports 1411 in the port block 1120 in both the first and second connecting positions.

Specifically, the motor case body 1110 in a state of being in the first connecting position is connectable to the port block 1120 with the pair of hydraulic fluid ports 1411 directed downwardly (refer to FIG. 14). Also the motor case body 1110 in a state of being in the second connecting position is connectable to the port block 1200 with the pair of hydraulic oil ports 1411 directed downwardly.

That is to say, the motor case body 1110 can be connected to the port block 1120 in a first connecting position (refer to FIG. 14) and in a second connecting position (refer to FIG. 16) which is circumferentially displaces by 180° from the first connecting position with respect to the motor shaft.

In this embodiment, as shown in FIG. 15A, four threaded holes 1116 are provided on the peripheral wall 1115 of the motor case body 1110 at its inner end face in the widthwise direction of the vehicle. The four threaded holes 1116 are disposed at 90° intervals around the corresponding motor shaft in the circumferential direction. The port block 1120 is provided with mounting holes 1126 corresponding to the four threaded holes 1116.

As mentioned above, the motor case body 1110 can be connected to the axle case 1000 and the port block 1120 in the first connecting position and the second connecting position which is 180° opposite from the first connecting position with respect to the motor shaft. This enables the first and the second axle-driving systems 10, 20 to be constructed with identical parts, while the direction of the fixed swash plate and the hydraulic fluid port in the first axle-driving systems 10, and the direction of the fixed swash plate and the hydraulic fluid port in the second axle-driving system 20 can be conformed to each other, respectively.

Specifically, if a known axle-driving system, in which a motor case is connected to an axle case and a port block only in a single connecting position, is applied to both a pair of right and left drive axles, the direction of a fixed swash plate in the known axle-driving system applied to the right drive axle, and the direction of a fixed swash plate in the known axle-driving system applied to the left drive axle become opposite to each other with respect to the traveling direction of the vehicle.

In that case, a pair of the hydraulic fluid lines that hydraulically connects one of a pair of axle-driving systems and the corresponding hydraulic pump unit need to be crossed.

In contrast, in this embodiment, the first axle-driving system 10 can be constructed by connecting the motor case body 1110 to the corresponding axle case 1000 and the corresponding port block 1120 in the first connecting position, and the second axle-driving system 20 can be constructed by connecting the motor case body 1110 to the corresponding axle case 1000 and corresponding port block 1120 in the second connecting position.

Therefore, the first and second axle-driving systems 10, 20 can be constructed with identical parts; the directions of the fixed swash plates of the first axle-driving system 10 and the second axle-driving system 20 can be conformed to each other with respect to the traveling vehicle direction of the vehicle; and also the directions of the hydraulic fluid ports 1411 in the port blocks of the first axle-driving system 10 and the second axle-driving system 20 can be conformed to each other with respect to the traveling direction of the vehicle.

Thus, neither of the pair of the first hydraulic fluid lines 400a nor the pair of second hydraulic fluid lines 400b needs to be crossed.

Preferably, a pair of through-holes 1118 (refer to FIG. 16) can be provided on the peripheral wall 1115 of the motor case body 1110 disposed symmetrically about the motor shaft.

In the axle-driving system (first axle-driving system 10) in the first connecting position, one of the pair of through-holes 1118 is connected to a drain conduit and the other is closed with a plug, while in the axle-driving system (second axle-driving system 20) in the second connecting position, one of the pair of through-holes is closed with a plug and the other is connected to the drain conduit.

Such a construction allows the direction of the drain port of the axle-driving system 10 in which the motor case body 1110 is connected to the axle case 1000 and the port block 1120 in the first connecting position can be the same as the direction of the drain port of the axle-driving system 20 in which the motor case body 1110 is connected to the axle case 1000 and the port block 1120 in the second connecting position, thereby improving the piping work and achieving the efficient arrangement of the drain conduits.

Embodiment 3

An axle-driving system according to another embodiment of the present invention will be described below with reference to the accompanying drawings.

Figure 17:
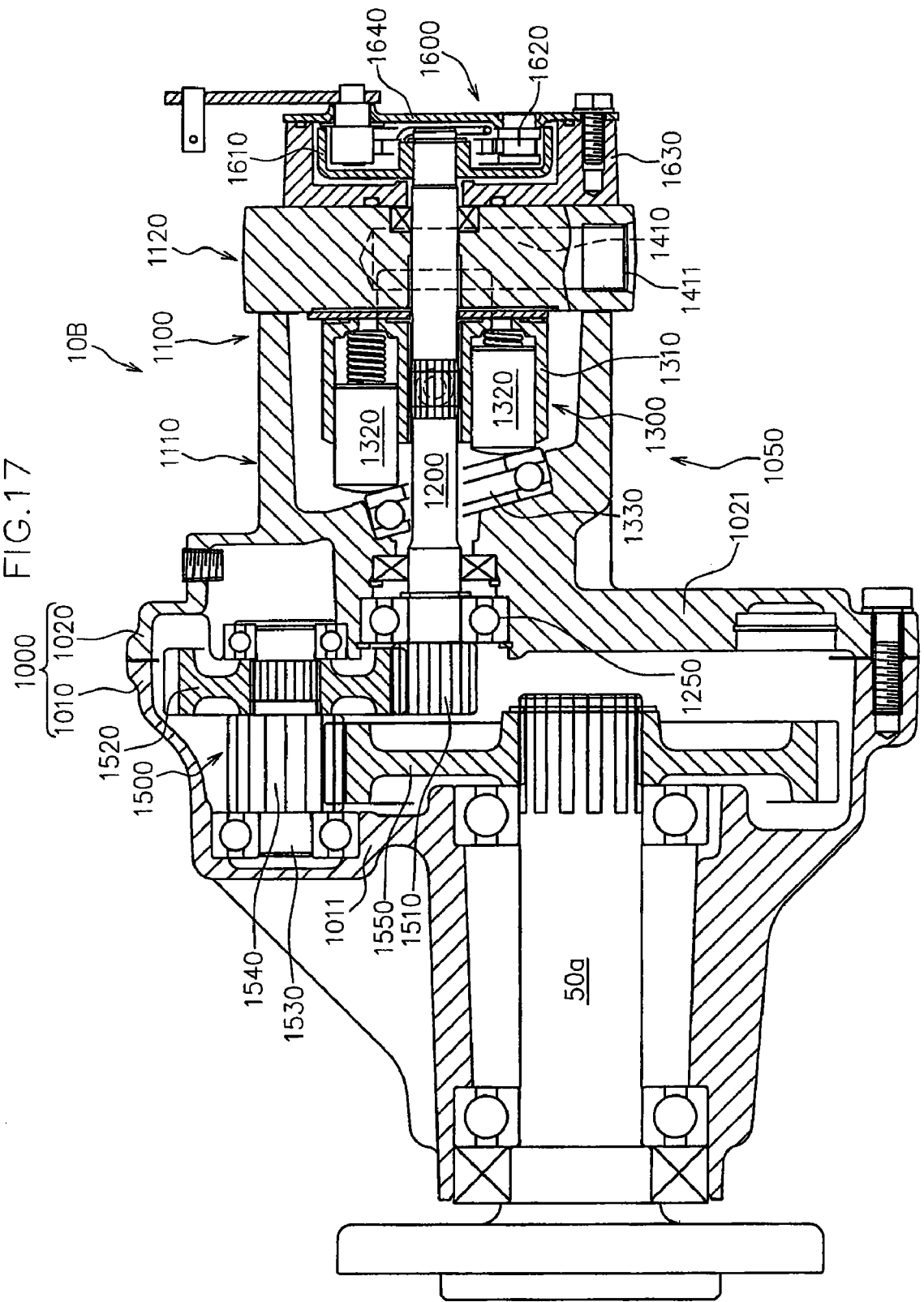
FIG. 17 is a front sectional view of the axle-driving system according to a third embodiment of the present invention.

FIG. 17 is a front sectional view of the axle-driving system 10B according to this embodiment.

It should be noted that the identical components to those in the embodiment 2 are denoted by the identical numerals in this Fig, and their detailed descriptions are omitted.

As shown in FIG. 17, the axle-driving system 10B according to this embodiment is identical to the axle-driving system 10A according to the embodiment 2 except that the motor case body 1110 is integrally formed with the inner case member 1020 of the axle case 1000.

Also in the axle-driving system 10B having such a construction, the capacity reduction and cost reduction of the brake unit 1600 can be achieved and the miniaturization of the entire apparatus with respect to the radial direction of the drive axle 50a can be achieved.

Embodiment 4

An axle-driving system according to still another embodiment of the present invention will be described below with reference to the accompanying drawings.

Figure 18:
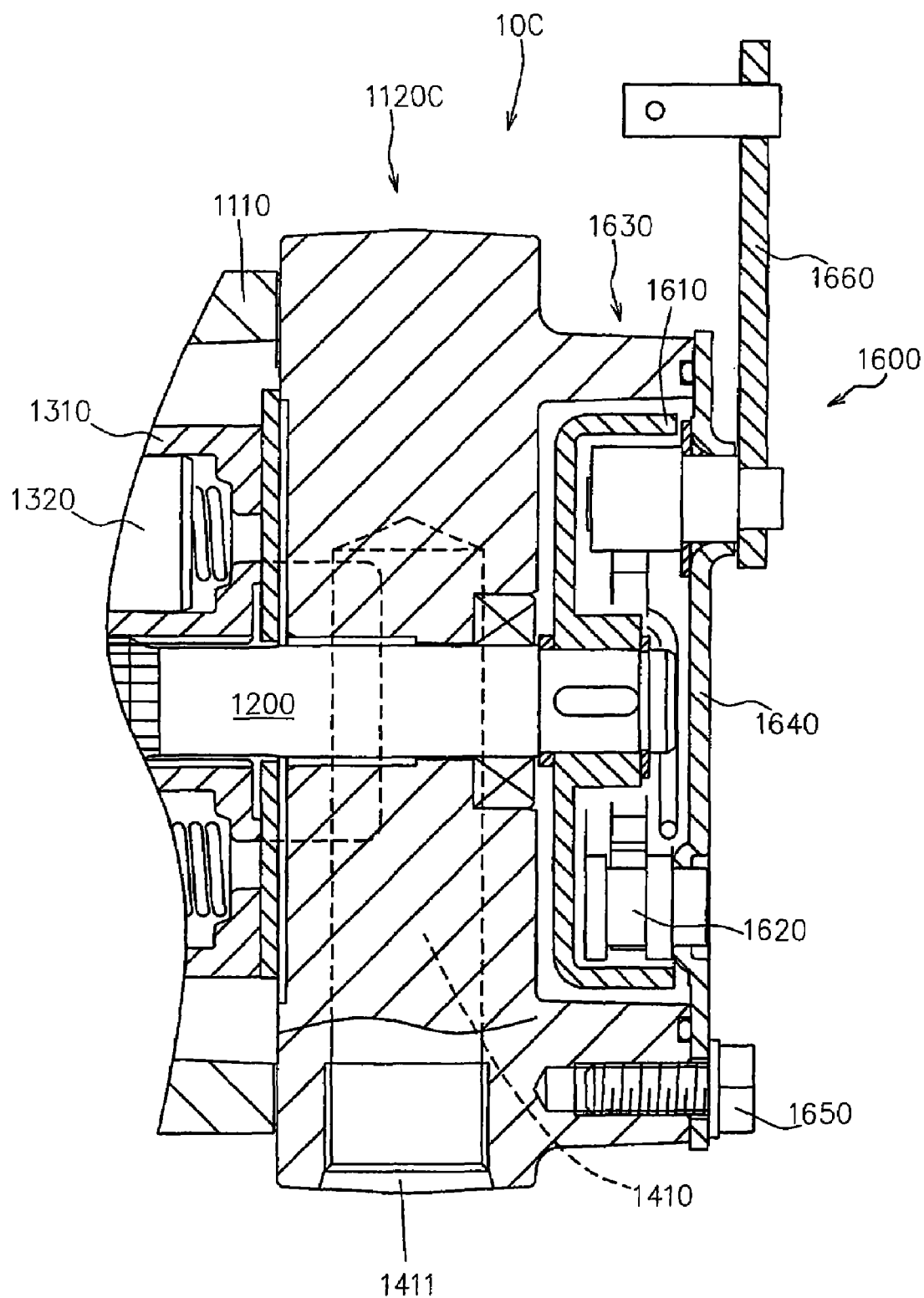
FIG. 18 is a partial front sectional view of the axle-driving system according to a fourth embodiment of the present invention.

FIG. 18 is a partial front sectional view of the axle-driving system 10C according to this embodiment.

It should be noted that the identical components to those in the embodiment 2 or 3 in this Fig. are denoted by the identical numerals, and their detailed descriptions are omitted.

In the embodiments 2 and 3, as mentioned above, the brake case 1630 accommodating the brake drum 1610 is separate from the port block 1120 (refer to FIGS. 14 and 17). In the axle-driving system 10C according to this embodiment, the brake case 1630 is integrally formed with a port block 1120C.

Specifically, the axle-driving system 10C according to this embodiment includes a port block 1120C having a brake case 1630 integrally formed therewith in place of the port block 1120 in the axle-driving systems 10, 10B according to the embodiment 2 or 3.

Also in the axle-driving system 10C having such a construction, the capacity reduction and cost reduction of the brake unit 1600 can be achieved, and the miniaturization of the entire apparatus with respect to the radial direction of the drive axle 50a can be achieved.

This specification is by no means intended to restrict the present invention to the preferred embodiments set forth therein. Various modifications to the pump system and the axle-driving system may be made by those skilled in the art without departing from the spirit and scope of the present invention as defined in the appended claims.

What is claimed is:

1. An axle-driving system comprising:

an axle case having an outer wall which supports a drive axle in a rotatable manner around its axis in a state that the drive axle is along a widthwise direction of a vehicle and an inner wall which is disposed apart from the outer wall inwardly in the widthwise direction of the vehicle so that the inner end portion of the drive axle in the widthwise direction of the vehicle is positioned between the inner wall and the outer wall;

a motor unit forming a non-stepwise speed change device in cooperation with an actuator disposed apart therefrom, the motor unit including a motor ease which is connected to the inner wall of the axle case, a motor shaft which is supported by the motor case in a rotatable manner around its axis in a state that the motor shaft is along the widthwise direction of the vehicle so as to be parallel to the drive axle, and a motor body which is accommodated in the motor case while being supported on the motor shaft; and a reduction transmission unit accommodated in the axle case, wherein the motor shaft has an outer end portion and an inner end portion in the widthwise direction of the vehicle, the outer end portion protruding outwardly from the motor case so as to be positioned inside an accommodating space of the axle case, and the inner end portion protruding outwardly from the motor case, the inner end portion of the motor shaft is provided with a brake unit, the reduction transmission unit includes an intermediate shaft supported by the axle case so as to be parallel to the motor shaft and the drive axle, an output gear provided on the motor shaft at its outer end portion in the widthwise direction of the vehicle, a first intermediate gear provided on the intermediate shaft so as to mesh with the output gear, a second intermediate gear provided on the intermediate shaft, and a final gear provided on the drive axle so as to mesh with the second intermediate gear, and the drive axle is positioned on a side of the motor shaft and the intermediate shaft is positioned on an opposite side of the motor shaft.

2. An axle-driving system according to claim 1, wherein the motor case includes a motor case body which has an outer end portion in the widthwise direction of the vehicle detachably coupled to the inner wall of the axle case, and an inner end portion in the widthwise direction of the vehicle forming an opening into which the motor body can be inserted; and a port block which is detachably coupled to the motor case body to close the opening in a liquid tight manner and is provided with a pair of hydraulic fluid ports serving as fluid connection ports for the actuator.

3. An axle-driving system according to claim 2, wherein the outer end portion of the motor case body in the widthwise direction of the vehicle is formed with a through-hole through which the motor shaft passes, the through-hole includes a central portion, and a large diameter portion which is enlarged from the central portion with a step and is opened outwardly in the widthwise direction of the vehicle, the large diameter portion is provided with a bearing member which supports the motor shaft in a rotatable manner around its axis, at least a portion of the bearing member protruding outwardly of the motor case body, and a recess which engages the protruding portion of the bearing member is provided on the outer surface of the inner wall of the axle case.

4. An axle-driving system according to claim 2, wherein the motor case body is configured to be connectable to the inner wall of the axle case in a first connecting position and in a second connecting position which is circumferentially displaced by 180° from the first connecting position with respect to the motor shaft.

5. An axle-driving system according to claim 2, wherein the motor case body is configured to be connectable to the port block in a first connecting position and in a second connecting position which is circumferentially displaced by 180° opposite from the first connecting position with respect to the motor shaft.

* * * * *

UNITED STATES PATENT AND TRADEMARK OFFICE
CERTIFICATE OF CORRECTION

| | | |
|---|---|---|
| PATENT NO. | : 7,658,257 B2 | Page 1 of 1 |
| APPLICATION NO. | : 12/163077 | |
| DATED | : February 9, 2010 | |
| INVENTOR(S) | : Sakikawa et al. | |

It is certified that error appears in the above-identified patent and that said Letters Patent is hereby corrected as shown below:

Column 24, line 58, reading "the motor unit including a motor ease" should read --the motor unit including a motor case--.

Signed and Sealed this

Twenty-seventh Day of April, 2010

David J. Kappos
*Director of the United States Patent and Trademark Office*